(12) United States Patent
Zou et al.

(10) Patent No.: US 11,689,106 B2
(45) Date of Patent: Jun. 27, 2023

(54) POWER SUPPLY CIRCUIT AND POWER SUPPLY CONTROL METHOD

(71) Applicant: Huawei Technologies Co., Ltd., Shenzhen (CN)

(72) Inventors: Peng Zou, Shenzhen (CN); Boning Huang, Dongguan (CN); Jianquan Wu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 17/451,986

(22) Filed: Oct. 22, 2021

(65) Prior Publication Data

US 2022/0045611 A1    Feb. 10, 2022

Related U.S. Application Data

(63) Continuation of application No. PCT/CN2019/084403, filed on Apr. 25, 2019.

(51) Int. Cl.
*H02M 3/158* (2006.01)

(52) U.S. Cl.
CPC ....... *H02M 3/1582* (2013.01); *H02M 3/1584* (2013.01)

(58) Field of Classification Search
None
See application file for complete search history.

(56) References Cited

U.S. PATENT DOCUMENTS

| | | | |
|---|---|---|---|
| 7,777,459 B2* | 8/2010 | Williams | H02M 3/155 323/266 |
| 9,312,763 B2* | 4/2016 | Xie | H02M 3/156 |

| | | | |
|---|---|---|---|
| 2016/0239036 A1 | 8/2016 | Paillet et al. | |
| 2018/0110123 A1 | 4/2018 | Sturcken et al. | |
| 2018/0301270 A1 | 10/2018 | Yang et al. | |

FOREIGN PATENT DOCUMENTS

| | | |
|---|---|---|
| CN | 1925291 | 3/2007 |
| CN | 101107581 | 1/2008 |
| CN | 102955551 | 3/2013 |
| CN | 103178707 A | 6/2013 |
| CN | 106612072 | 5/2017 |
| CN | 107209527 A | 9/2017 |
| CN | 107481833 | 12/2017 |
| CN | 208174562 | 11/2018 |
| WO | 2018161422 | 9/2018 |

OTHER PUBLICATIONS

Burton, Edward A. et al, "FIVR—Fully Integrated Voltage Regulators on 4th Generation Intel Core SoCs," 2014, 8 pages.

* cited by examiner

*Primary Examiner* — Jeffery S Zweizig
(74) *Attorney, Agent, or Firm* — Slater Matsil, LLP

(57) ABSTRACT

The invention disclose a power supply circuit. The power supply circuit includes one or a plurality of first-stage voltage conversion circuits and one or a plurality of second-stage voltage conversion circuits; an input end of the first-stage voltage conversion circuit is coupled to a power supply; the first-stage voltage conversion circuit is configured to convert a first voltage received at the input end into a second voltage, where the second voltage is less than the first voltage; an input end of the second-stage voltage conversion circuit is coupled to an output end of the first-stage voltage conversion circuit; the second-stage voltage conversion circuit is configured to convert the second voltage into a third voltage, and supply the third voltage to a load.

19 Claims, 11 Drawing Sheets

POWER SUPPLY CIRCUIT AND POWER SUPPLY CONTROL METHOD

CROSS-REFERENCE TO RELATED APPLICATIONS

This application is a continuation of International Application No. PCT/CN2019/084403, filed on Apr. 25, 2019, the disclosure of which is hereby incorporated by reference in its entirety.

TECHNICAL FIELD

Embodiments of this application relate to the field of circuit technologies, and in particular, to a power supply circuit and a power supply control method.

BACKGROUND

Currently, a power supply architecture of a system (for example, a smartphone) includes a plurality of voltage converters (buck converter). The plurality of voltage converters may convert an input voltage of a battery or a given input voltage into a required voltage, to supply power to a load module.

As shown in FIG. 1, voltage converters perform point-to-point voltage conversion and between an input voltage (the input voltage of a battery) and load modules (such as a central processing unit (CPU) physical core, and a graphics processing unit (GPU) physical core) and supply power to the load modules. To refine power supply management and improve system energy efficiency, a quantity of voltage converters is increasing. In addition, each voltage conversion circuit needs to be designed based on a maximum peak current of the load (even if a current in a typical operating scenario is much less than the peak current). Because an area of a printed circuit board (PCB) of a power supply is directly proportional to the maximum current, and the peak current and a quantity of power supply both increase with a requirement for improving system performance, the area of the PCB of the power supply also gradually increases. However, an area of the system (for example, the smartphone) is usually fixed or limited. Therefore, an increasing board area occupied by the power supply poses a significant challenge on a system solution.

SUMMARY

Embodiments of this application provide a power supply circuit and a power supply control method, to reduce a board area occupied by an overall power supply, improve a power density, and improve power supply efficiency of a system.

To achieve the foregoing objectives, the following technical solutions are used in the embodiments of this application.

According to a first aspect of the embodiments of this application, a power supply circuit is provided. The power supply circuit includes one or a plurality of first-stage voltage conversion circuits and one or a plurality of second-stage voltage conversion circuits. An input end of the first-stage voltage conversion circuit is coupled to a power supply; and the first-stage voltage conversion circuit is configured to convert a first voltage received at the input end of the first-stage voltage conversion circuit into a second voltage, and output the second voltage from an output end of the first-stage voltage conversion circuit, where the second voltage is less than the first voltage, and the second voltage is greater than or equal to 0.6 V and less than or equal to 1.3 V. An input end of the second-stage voltage conversion circuit is coupled to the output end of the first-stage voltage conversion circuit, and the second-stage voltage conversion circuit is configured to convert the second voltage into a third voltage, and supply the third voltage to a load, where the third voltage is less than the second voltage. A switching frequency of the second-stage voltage conversion circuit is greater than or equal to 30 MHz. Based on the solution, in the power supply circuit that includes the first-stage voltage conversion circuit and the second-stage voltage conversion circuit, the second-stage voltage conversion circuit only needs to further convert the voltage in a low-voltage range, for example, a range from 0.6 V to 1.3 V. In addition, the second-stage voltage conversion circuit also uses a high-frequency switch greater than 30 MHz. This greatly reduces a space requirement of the power supply circuit. In addition, the plurality of second-stage voltage conversion circuits can share the first-stage voltage conversion circuit, the space requirement of the power supply circuit in this embodiment of the present invention is further reduced. Therefore, a board area occupied by the power supply circuit is greatly reduced, a power density of the power supply circuit is greatly improved, and power supply efficiency of the power supply circuit is improved.

With reference to the first aspect, in a possible implementation, when one first-stage voltage conversion circuit supplies power to the one or the plurality of second-stage voltage conversion circuits, an input end of each second-stage voltage conversion circuit is connected to an output end of the first-stage voltage conversion circuit. Based on this solution, each first-stage voltage conversion circuit can supply power to the one or the plurality of second-stage voltage conversion circuits, and then the second-stage voltage conversion circuit supplies power to the load. In this manner, the power supply circuit provided in this embodiment of the present invention forms a tree structure. Different combinations of the first-stage voltage conversion circuit and the second-stage voltage conversion circuits can implement refined management of power supply of a plurality of types of load, thereby improving power supply efficiency.

With reference to the first aspect and the foregoing possible implementation, in another possible implementation, the second-stage voltage conversion circuit includes an inductor, a capacitor, a first switch, and a second switch. A first end of the first switch is connected to the output end of the first-stage voltage conversion circuit, a second end of the first switch is connected to a first end of the inductor and a first end of the second switch, and a control end of the first switch is configured to input a first control signal. A second end of the inductor is an output end of the second-stage voltage conversion circuit, the second end of the inductor is connected to a first end of the capacitor, and a second end of the capacitor and a second end of the second switch are grounded. A control end of the second switch is configured to input a second control signal. Switching frequencies of the first switch and the second switch are greater than or equal to 30 MHz. Based on this solution, the two switching transistors work at high frequencies. This can greatly reduce the board area occupied by the power supply circuit while ensuring that a transient performance requirement of a load change is satisfied.

With reference to the first aspect and the foregoing possible implementations, in another possible implementation, when the switching frequencies of the first switch and the second switch are greater than or equal to 30 MHz, an inductance density of the inductor is greater than or equal to 10 nH/mm$^2$, the inductance density of the inductor is greater than or equal to 40 nH/mm$^3$, and a coil direct current impedance of the inductor is less than or equal to 30 mΩ. It may be understood that, when the first inductor works at a high frequency, an inductance per unit area (per square millimeter) of the first inductor is greater than or equal to 10 nH, and an inductance per unit volume (per cubic millimeter) of the first inductor is greater than or equal to 40 nH. That is, the inductance per unit area and the inductance per unit volume of the first inductor are greatly improved compared with an inductance per unit area and an inductance per unit volume of an inductor in the conventional technology. Therefore, when the inductances are the same, both a board area occupied by the first inductor and a volume of the first inductor are relatively small. Based on this solution, the board area occupied and the volume of the inductor in the foregoing specification are relatively small, so that the power supply circuit is more integrated. In addition, when the inductor works at a high frequency, a loss of the second-stage voltage conversion circuit is reduced. This improves power supply efficiency of the second-stage voltage conversion circuit.

With reference to the first aspect and the foregoing possible implementations, in another possible implementation, the inductor is a film inductor. The film inductor includes: a magnetic core, including a first magnetic film and a second magnetic film, where an accommodation cavity is disposed between the first magnetic film and the second magnetic film; a conductor, located in the accommodation cavity; and an insulating isolation film, disposed on two sides of the conductor and located between the first magnetic film and the second magnetic film, where the insulating isolation film is in contact with the first magnetic film and the second magnetic film; the first magnetic film and the second magnetic film each include a plurality of layers of magnetic sub-films and a plurality of layers of insulating sub-films; the magnetic sub-films and the insulating sub-films are alternately disposed in the first magnetic film; the magnetic sub-films and the insulating sub-films are alternately disposed in the second magnetic film; and the plurality of layers of magnetic sub-films and the plurality of layers of insulating sub-films in the first magnetic film are exposed from a surface that is of the first magnetic film and that is in contact with the insulating isolation film, and/or the plurality of layers of magnetic sub-films and the plurality of layers of insulating sub-films in the second magnetic film are exposed from a surface that is of the second magnetic film and that is in contact with the insulating isolation film. Based on this solution, the circuit is more integrated. In addition, when the second-stage voltage conversion circuit works at the high frequency, the impedance of the first inductor in the high-frequency switch circuit (the second-stage voltage conversion circuit) is relatively small, and the loss is relatively low.

With reference to the first aspect and the foregoing possible implementations, in another possible implementation, the second-stage voltage conversion circuit includes an inductor, a capacitor, a third switch, a fourth switch, a fifth switch, and a sixth switch. A first end of the third switch is connected to the output end of the first-stage voltage conversion circuit, a second end of the third switch is connected to a first end of the fourth switch, and a control end of the third switch is configured to input a third control signal. A second end of the fourth switch is connected to a first end of the inductor and a first end of the fifth switch, and a control end of the fourth switch is configured to input a first bias voltage. A second end of the fifth switch is connected to a first end of the sixth switch, and a control end of the fifth switch is configured to input a second bias voltage. A second end of the inductor is the output end of the second-stage voltage conversion circuit, the second end of the inductor is connected to a first end of the capacitor, and a second end of the capacitor and a second end of the sixth switch are grounded. A control end of the sixth switch is configured to input a fourth control signal. Based on this solution, compared with the conventional technology, the board area occupied by the power supply circuit can be reduced, the power density is greatly improved, and power supply efficiency is relatively high.

With reference to the first aspect and the foregoing possible implementations, in another possible implementation, a peak power of the first-stage voltage conversion circuit is less than a peak power of the one second-stage voltage conversion circuit connected to the first-stage voltage conversion circuit or a sum of peak powers of the plurality of second-stage voltage conversion circuits connected to the first-stage voltage conversion circuit. Based on this solution, this can avoid that the peak power of the first-stage voltage conversion circuit is designed to be extremely large, the board area occupied by the first-stage power supply circuit is further reduced, and the power density of the power supply circuit is improved.

With reference to the first aspect and the foregoing possible implementations, in another possible implementation, the first-stage voltage conversion circuit is a switched-capacitor voltage conversion circuit, a switched-capacitor voltage conversion circuit with a variable conversion ratio, a buck DC-DC conversion circuit, a multi-level buck conversion circuit, a transformer-isolated buck conversion circuit, a hybrid voltage conversion circuit in which a switched inductor and a switched capacitor are combined, or a resonant switched-capacitor voltage conversion circuit. Based on this solution, conversion efficiency of the first-stage voltage conversion circuit is relatively high, and power supply efficiency is further improved.

With reference to the first aspect and the foregoing possible implementations, in another possible implementation, the second-stage voltage conversion circuit is integrated with the load. Based on this solution, the power supply circuit is more integrated and has a higher power density.

With reference to the first aspect and the foregoing possible implementation, in another possible implementation, when the first switch is turned on, the second switch is turned off; and when the second switch is turned on, the first switch is turned off. Based on this solution, voltage step-down conversion of the second-stage voltage conversion circuit can be implemented by controlling on/off of the first switch and the second switch.

According to a second aspect of the embodiments of this application, a power supply control method is provided and the method is applied to a power supply system. The power supply system includes the power supply circuit in any implementation of the first aspect, a master controller connected to the first-stage voltage conversion circuit, a first slave controller connected to the second-stage voltage conversion circuit, and a second slave controller connected to the load. The master controller, the first slave controller, and the second slave controller are connected through a control bus. The power supply control method includes: When the load is started, the second slave controller sends power request information to the master controller, where the power request information is used to request an available power of the first-stage voltage conversion circuit; receives a power response message sent by the master controller, where the power response message carries the available power of the first-stage voltage conversion circuit; and if the available power of the first-stage voltage conversion circuit is less than a power required for starting the load, sends the power request information to the master controller again after first duration elapses. Based on this solution, a plurality of peak services can be staggered by using a maximum power limit mechanism, to reduce energy lost on an internal resistance of a power supply, and improve efficiency of the power supply system.

With reference to the second aspect, in a possible implementation, the available power of the first-stage voltage conversion circuit is a maximum output power of the first-stage voltage conversion circuit minus a used power. The used power is a current output power of one second-stage voltage conversion circuit connected to the first-stage voltage conversion circuit or a sum of current output powers of a plurality of second-stage voltage conversion circuits connected to the first-stage voltage conversion circuit. For example, the maximum output power of the first-stage voltage conversion circuit may be a preset value. Based on this solution, the available power of the first-stage voltage conversion circuit may be determined based on the maximum output power of the first-stage voltage conversion circuit and the sum of the current output powers of the second-stage voltage conversion circuits.

With reference to the second aspect and the foregoing possible implementation, in another possible implementation, if the power supply circuit includes a plurality of first-stage voltage conversion circuits, the method further includes: The main controller determines a first reference delay corresponding to each first-stage voltage conversion circuit, where the first reference delay is a delay corresponding to each first-stage voltage conversion circuit when a ripple amplitude of a first voltage is the smallest; and adjusts a conduction time period of each first-stage voltage conversion circuit based on the first reference delay. Based on this solution, switching transistors of the plurality of first-stage voltage conversion circuits can be staggered (staggeredly turned on), to reduce a voltage ripple.

With reference to the second aspect and the foregoing possible implementations, in another possible implementation, if the first-stage voltage conversion circuit supplies power to the plurality of second-stage voltage conversion circuits, the method further includes: The main controller determines a second reference delay corresponding to each second-stage voltage conversion circuit connected to the first-stage voltage conversion circuit, where the second reference delay is a delay corresponding to each second-stage voltage conversion circuit when a ripple amplitude of a second voltage is the smallest; and adjusts a conduction time period of each second-stage voltage conversion circuit based on the second reference delay. Based on this solution, switching transistors of the plurality of second-stage voltage conversion circuits can be staggered (staggeredly turned on), to reduce a voltage ripple.

With reference to the second aspect and the foregoing possible implementations, in another possible implementation, the power system further includes a delay circuit. That the main controller determines a first reference delay corresponding to each first-stage voltage conversion circuit includes: The master controller configures, based on a system reference clock and the delay circuit, a delay for turning on or turning off a switch in each first-stage voltage conversion circuit, to determine the first reference delay.

Based on this solution, the reference delay can be determined by using the delay circuit, so that the voltage ripple is minimized.

With reference to the second aspect and the foregoing possible implementations, in another possible implementation, that the main controller determines a second reference delay corresponding to each second-stage voltage conversion circuit connected to the first-stage voltage conversion circuit includes: The master controller configures, based on the system reference clock and the delay circuit, a delay for turning on or turning off a switch in each second-stage voltage conversion circuit, to determine the second reference delay. Based on this solution, the reference delay can be determined by using the delay circuit, so that the voltage ripple is minimized.

With reference to the second aspect and the foregoing possible implementations, in another possible implementation, the method further includes: If the load starts a high-performance service, the main controller increases an output voltage of the first-stage voltage conversion circuit; and if the load works in a low power consumption state, the main controller decreases the output voltage of the first-stage voltage conversion circuit. Based on this solution, when the load runs different services, the output voltage of the first-stage voltage conversion circuit can be adjusted, to satisfy service requirements in different cases, and improve power supply efficiency.

With reference to the second aspect and the foregoing possible implementations, in another possible implementation, the method further includes: The master controller obtains a current output power of a second-stage voltage conversion circuit from the first slave controller; and if the current output power of the one second-stage voltage conversion circuit connected to the first-stage voltage conversion circuit or the sum of the current output powers of the plurality of second-stage voltage conversion circuits connected to the first-stage voltage conversion circuit is greater than the maximum output power of the first-stage voltage conversion circuit, the main controller sends alarm information to an operating system. Based on this solution, when an abnormality that the power exceeds occurs, the alarm information can be sent to handle the abnormality.

According to a third aspect of the embodiments of this application, an integrated circuit system is provided. The integrated circuit system includes a first chip and a second chip, the first chip includes a first-stage voltage conversion circuit, and the second chip includes a second-stage voltage conversion circuit. An input end of the first-stage voltage conversion circuit is coupled to a power supply. The first-stage voltage conversion circuit is configured to convert a first voltage received at the input end of the first-stage voltage conversion circuit into a second voltage, and output the second voltage from an output end of the first-stage voltage conversion circuit, where the second voltage is less than the first voltage, and the second voltage is greater than or equal to 0.6 V and less than or equal to 1.3 V. An input end of the second-stage voltage conversion circuit is coupled to the output end of the first-stage voltage conversion circuit, and the second-stage voltage conversion circuit is configured to convert the second voltage into a third voltage, and supply the third voltage to a load, where the third voltage is less than the second voltage. A switching frequency of the second-stage voltage conversion circuit is greater than or equal to 30 MHz. Based on this solution, the power supply voltage may be reduced to a range from 0.6 V to 1.3 V by using the first chip, and the voltage in the range from 0.6 V to 1.3 V is used as an input voltage of the second chip.

Because the second-stage voltage conversion circuit in the second chip uses a high-frequency switch greater than 30 MHz, a space requirement of the second chip can be greatly reduced. In addition, when the first-stage voltage conversion circuit may supply input voltages to a plurality of second-stage voltage conversion circuits, a space requirement of the integrated circuit system in this embodiment of the present invention is further reduced. Therefore, a board area occupied by the integrated circuit system is greatly reduced, a power density of the integrated circuit system is greatly improved, and power supply efficiency of the integrated circuit system is improved.

With reference to the third aspect, in a possible implementation, the second chip is a processor chip, and the first chip is a power supply chip that supplies power to the processor chip. Based on this solution, the second-stage voltage conversion circuit may be integrated into the processor chip, and the first chip may supplies power to the processor chip.

According to a fourth aspect of the embodiments of this application, a computer storage medium is provided, where the computer storage medium stores computer program code; and when the computer program code is run on a processor, the processor is enabled to perform the power supply control method according to any one of the second aspect or the possible implementations of the second aspect. For example, the processor may be a CPU; and a master controller and a slave controller may be other processors, digital logic modules, or function modules in the CPU.

According to a fifth aspect of the embodiments of this application, a computer program product is provided. The program product stores computer software instructions executed by the foregoing processor. The computer software instructions include programs used to perform the solutions in the foregoing aspects.

According to a sixth aspect of the embodiments of this application, an apparatus is provided. The apparatus exists in a product form of a chip. A structure of the apparatus includes a processor and a memory. The memory is configured to couple to the processor, and stores program instructions and data that are necessary for the apparatus. The processor is configured to execute the program instructions stored in the memory, so that the apparatus performs a function of the power supply control apparatus in the foregoing methods.

According to a seventh aspect of the embodiments of this application, a terminal is provided. The terminal includes a processor, the power supply circuit according to any one of the first aspect or the possible implementations of the first aspect, and the processor is configured to perform the power supply control method according to any one of the second aspect or the possible implementations of the second aspect.

DETAILED DESCRIPTION OF ILLUSTRATIVE EMBODIMENTS

The following describes technical solutions in embodiments of this application with reference to accompanying drawings in the embodiments of this application. In this application, "at least one" means one or more, and "a plurality of" means two or more. "And/or" describes an association relationship between associated objects, and represents that three relationships may exist. For example, A and/or B may represent the following cases: A exists alone, both A and B exist, and B exists alone, where A and B may be singular or plural. The character "/" usually represents an "or" relationship between associated objects. "At least one of the following items (pieces)" or a similar expression thereof means any combination of these items, including any combination of singular items (pieces) or plural items (pieces). For example, at least one of a, b, or c may represent a; b; c; a and b; a and c; b and c; or a, b, and c, where a, b, and c may be singular or plural.

To resolve a problem in the conventional technology that a power supply occupies a relatively large board area as system performance improves, an embodiment of this application provides a power supply circuit. The power supply circuit can reduce a board area occupied by an overall power supply, has a relatively high power density, and improves power supply efficiency of a system.

An embodiment of this application further provides a power supply circuit, and the power supply circuit may be used in a terminal device. The terminal device may be a device, for example, a mobile phone, a tablet computer, a notebook computer, or a netbook. A specific form of the terminal device in which the power supply circuit is used is not specifically limited in this embodiment of this application.

Figure 1:
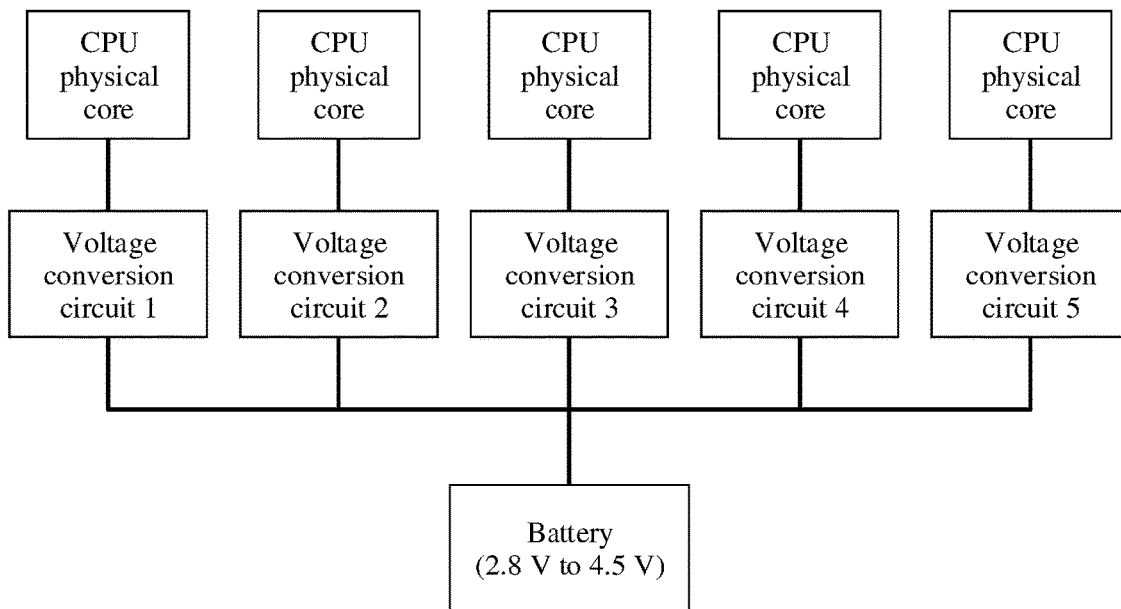
FIG. 1 is a schematic diagram of a power supply solution according to the conventional technology.
Figure 2:
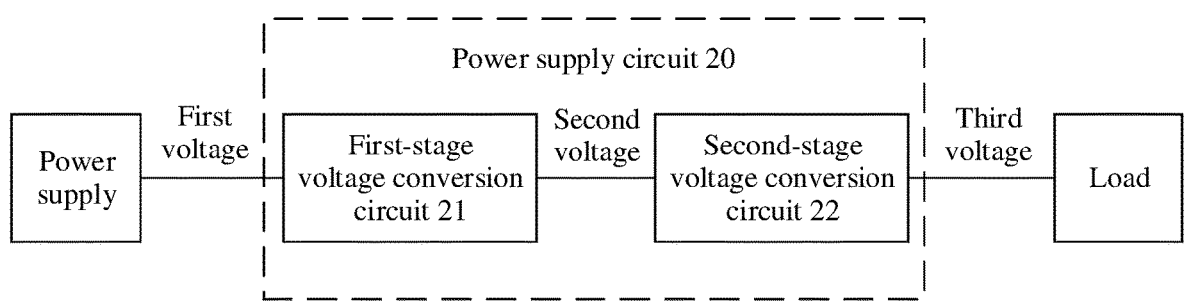
FIG. 2 is a schematic diagram of a structure of a power supply circuit according to an embodiment of this application.

As shown in FIG. 2, the power supply circuit 20 includes one or a plurality of first-stage voltage conversion circuits 21 and one or a plurality of second-stage voltage conversion circuits 22. An input end of the first-stage voltage conversion circuit 21 is coupled to a power supply, and an input end of the second-stage voltage conversion circuit 22 is coupled to an output end of the first-stage voltage conversion circuit 21.

The first-stage voltage conversion circuit 21 is configured to convert a first voltage received at the input end of the first-stage voltage conversion circuit 21 into a second voltage, and output the second voltage from the output end of the first-stage voltage conversion circuit 21, where the second voltage is less than the first voltage, and the second voltage is greater than or equal to 0.6 V and less than or equal to 1.3 V.

The second-stage voltage conversion circuit 22 is configured to convert the second voltage into a third voltage, and supply the third voltage to a load, where the third voltage is less than the second voltage. A switching frequency of the second-stage voltage conversion circuit 22 is greater than or equal to 30 MHz.

A wireless terminal device is used as an example for description. A power supply voltage in the wireless terminal device (usually a voltage of a battery in the wireless terminal device) is generally about 4.5 V. The power supply circuit 20 in this embodiment of the present invention uses two-stage voltage conversion circuit. First, a voltage is preliminarily reduced to a range from 0.6 V to 1.3 V by using the first-stage voltage conversion circuit 21. Then, voltage step-down is performed again by using the second-stage voltage conversion circuit 22. An input voltage of the second-stage voltage conversion circuit 22 is merely between 0.6 V and 1.3 V. Therefore, when a power supply voltage of a load in the wireless terminal device is low (for example, when a processor chip of the wireless terminal uses an advanced complementary metal oxide semiconductor (CMOS) whose process node is 5 nm, 7 nm, or the like in a manufacturing procedure, a power supply voltage of the processor chip may be reduced to about 0.6 V), because a smaller voltage difference between the input voltage and an output voltage indicates higher conversion efficiency, conversion efficiency of the second-stage voltage conversion circuit 22 is relatively high after voltage step-down is performed by using the second-stage voltage conversion circuit. In addition, a withstand voltage of one switching transistor is about 1V. Therefore, after the input voltage is reduced to about 1.1 V (between 0.6 V and 1.3 V) by using the first-stage voltage conversion circuit, the second-stage voltage conversion circuit may use two switching transistors to implement voltage step-down. Compared with a manner using four switching transistors, this manner reduces a quantity of switches, and therefore the circuit is more integrated and losses of the switches are greatly reduced.

For example, the second-stage voltage conversion circuit 22 may adopt a design of a high-frequency switch circuit. In other words, the second-stage voltage conversion circuit has a switching transistor with a higher working frequency, for example, 30 MHz. It may be understood that a lower working frequency of the switching transistor indicates a lower loss and higher efficiency of the switching transistor. However, transient performance of a load change may not be satisfied. In addition, a relatively large ripple current greatly interfere with the battery. Therefore, after factors such as efficiency and the transient performance of the load change are considered, the frequency of the switching transistor in the second-stage voltage conversion circuit 22 in this embodiment of this application may be greater than or equal to 30 MHz.

It may be understood that when a low-frequency switching circuit (a switching frequency is generally less than 5 MHz) is used, because a higher transient performance requirement of the load indicates a larger transient current change of the load, more capacitor elements are needed in the circuit to store energy. Consequently, a board area occupied by the circuit is also larger. However, in this application, the second-stage voltage conversion circuit 22 adopts the design of the high-frequency switch circuit, so that the transient performance requirement of the load change can be satisfied, and a quantity of energy storage elements such as a capacitor can be reduced. Consequently, the board area occupied by the circuit is greatly reduced. Therefore, when the working frequency of the switching transistor in the second-stage voltage conversion circuit is higher than the working frequency of a switching transistor in the low-frequency switching circuit in the conventional technology, a power density of the circuit is significantly improved compared with that of the low-frequency switching circuit in the conventional technology, the circuit is more integrated, and the board area occupied by the circuit is greatly reduced.

Figure 3:
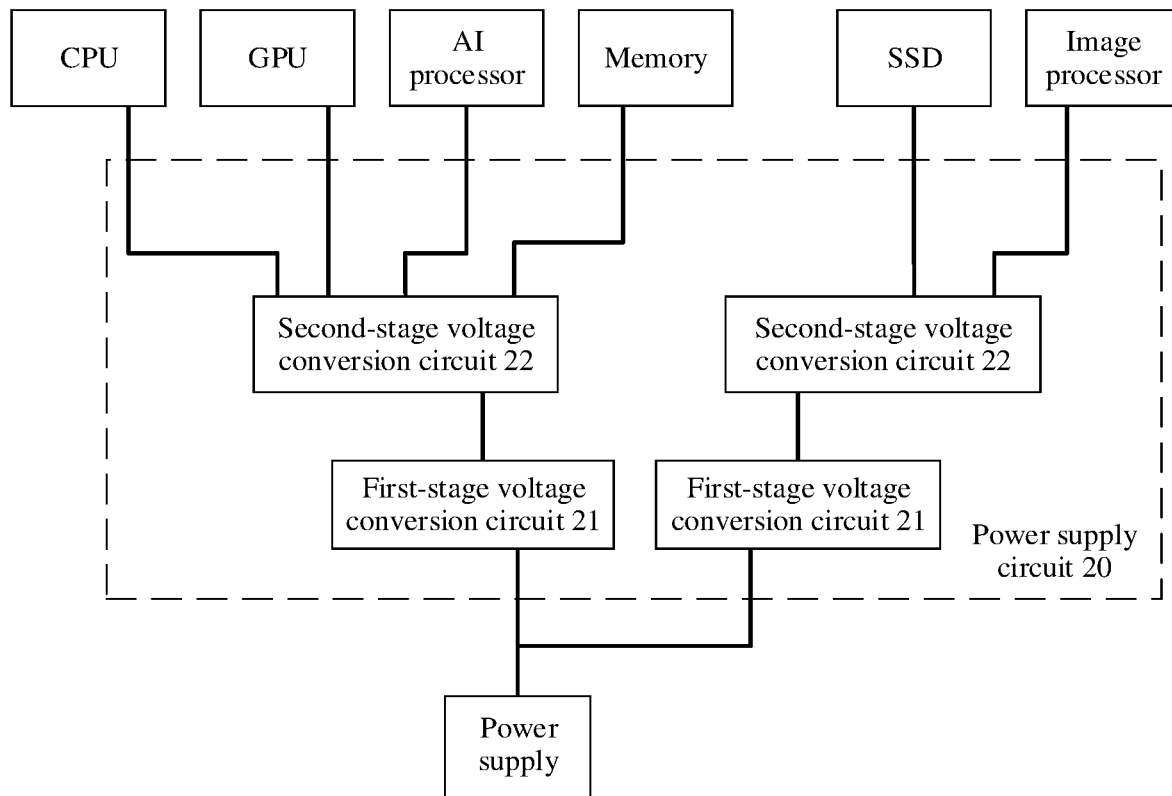
FIG. 3 is a schematic diagram of a structure of another power supply circuit according to an embodiment of this application.

For example, an input end of each first-stage voltage conversion circuit 21 is coupled to the power supply. One first-stage voltage conversion circuit 21 may supply power to the one or the plurality of second-stage voltage conversion circuits 22, and an input end of each second-stage voltage conversion circuit 22 is connected to an output end of the first-stage voltage conversion circuit 21. For example, as shown in FIG. 3, the power supply circuit 20 includes two first-stage voltage conversion circuits 21 and two second-stage voltage conversion circuits 22, and the input end of each second-stage voltage conversion circuit 22 is connected to the output end of one first-stage voltage conversion circuit 21. A specific quantity of first-stage voltage conversion circuits 21 and a specific quantity of second-stage voltage conversion circuits 22 are not limited in this embodiment of this application. FIG. 3 is merely an example for description. In an actual application, the quantity of first-stage voltage conversion circuits 21, the quantity of second-stage voltage conversion circuits 22, and a connection manner of the first-stage voltage conversion circuits 21 and the second-stage voltage conversion circuits 22 may be configured based on parameters such as a power supply requirement and a location of the load. It may be understood that the third voltage output by the power supply circuit 20 may be used to supply power to loads such as a central processing unit (CPU), a graphics processing unit (GPU), an artificial intelligence (AI) processor, a memory, a solid-state drive (SSD), and an image processor in FIG. 3. The CPU, the GPU, and the AI processor may be multi-core processors.

For example, if the first-stage voltage conversion circuit 21 supplies power to M second-stage voltage conversion circuits 22, where M is greater than or equal to 1. In other words, input ends of the M second-stage voltage conversion circuits 22 are connected to the output end of the first-stage voltage conversion circuit 21. A peak power of the first-stage voltage conversion circuit 21 may be less than a sum of peak powers of the M second-stage voltage conversion circuits 22 connected to the first-stage voltage conversion circuit 21. It may be understood that, because all loads of the wireless terminal device do not work at a peak power at the same time, the peak power of the first-stage voltage conversion circuit 21 in the power supply circuit 20 may be less than the sum of the peak powers of all the second-stage voltage conversion circuits 22 connected to the first-stage voltage conversion circuits 21. Therefore, this can avoid that the peak power of the first-stage voltage conversion circuit 21 is designed to be extremely large. In addition, a larger peak current indicates a larger volume and a larger area of an inductor in the circuit. When an output voltage is fixed, a peak power is also larger, and the board area occupied by the circuit is also larger. In other words, the board area occupied by the circuit is directly proportional to the peak power. Therefore, the peak power of the first-stage voltage conversion circuit 21 is designed to be less than the sum of the peak powers of all the second-stage voltage conversion circuits 22 connected to the first-stage voltage conversion circuit 21. Compared with point-to-point voltage conversion in the conventional technology in which each voltage conversion circuit is designed based on a maximum peak current of a load, this manner can reduce the board area occupied by the voltage conversion circuit, and further improve the power density of the power supply circuit. For example, the output voltage of the second-stage voltage conversion circuit is 0.6 V, and a sum of peak currents of the second-stage voltage conversion circuits is 100 A. In this case, the sum of the peak powers of the second-stage voltage conversion circuits is 60 W. However, in an actual application, a power of the wireless terminal device (for example, a mobile phone) is generally about 3 W to 4 W. Therefore, the peak power of the first-stage voltage conversion circuit may be designed to be less than the sum of the peak powers of all the second-stage voltage conversion circuits connected to the first-stage voltage conversion circuit. For example, the peak power of the first-stage voltage conversion circuit 21 may be designed to be 20% of the sum of the peak powers of all the second-stage voltage conversion circuits 22 connected to the first-stage voltage conversion circuit 21. A specific value of the peak power of the first-stage voltage conversion circuit is not limited in this embodiment of this application, and is merely an example for description herein.

For example, the first-stage voltage conversion circuit 21 may implement voltage conversion by using an efficient direct current-direct current (DC-DC) voltage conversion circuit, for example, a switched-capacitor voltage conversion circuit, a switched-capacitor voltage conversion circuit with a variable conversion ratio, a buck DC-DC conversion circuit, a multi-level buck conversion circuit, a transformer-isolated buck conversion circuit, a hybrid voltage conversion circuit in which a switched inductor and a switched capacitor are combined, or a resonant switched-capacitor voltage conversion circuit. A specific circuit structure of the first-stage voltage conversion circuit 21 is not limited in this embodiment of this application.

It should be noted that the first-stage voltage conversion circuit 21 may be a closed-loop controlled voltage stabilizing and rectifying circuit. In this case, an output voltage (the second voltage) of the first-stage voltage conversion circuit 21 is constant, and a change in an input voltage (the first voltage) does not affect the output voltage. Alternatively, the first-stage voltage conversion circuit 21 may be an open-loop controlled buck conversion, and the output voltage (the second voltage) may be changed based on a fixed conversion ratio of the output voltage to the input voltage (the first voltage). This is not limited in this embodiment of this application.

For example, the input power supply of the first-stage voltage conversion circuit 21 may have a voltage range that is of a plurality of types and that is wide. For example, the voltage range may be a voltage range from 2.8 V to 4.5 V of a single battery, a voltage range from 8.4 V to 13.5 V of three batteries connected in series, a voltage range of a fixed input supplied by an upper-stage system power supply, or the like. This is not limited in this embodiment of this application.

Figure 4:
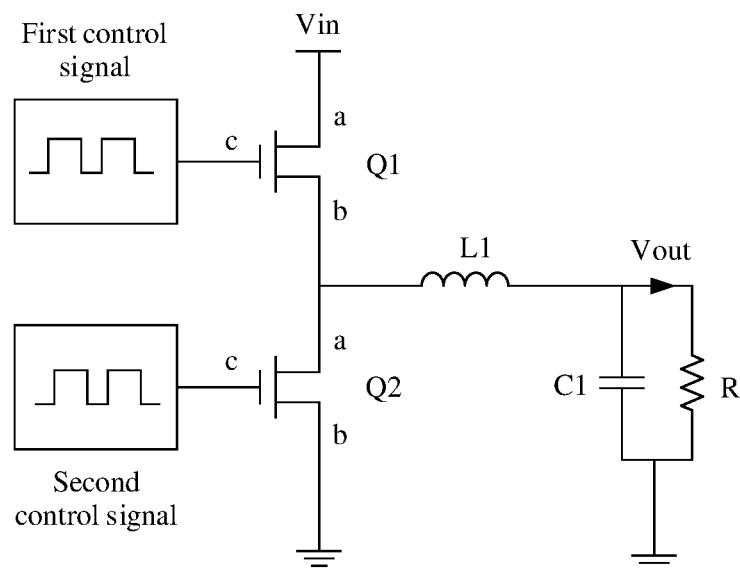
FIG. 4 is a circuit diagram of a second-stage voltage conversion circuit according to an embodiment of this application.

In an implementation, the second-stage voltage conversion circuit 22 may use a buck circuit shown in FIG. 4. As shown in FIG. 4, the second-stage voltage conversion circuit 22 includes a first inductor L1, a first capacitor C1, a first switch Q1, and a second switch Q2. A first end (a) of the first switch Q1 is an input end Vin of the second-stage voltage conversion circuit 22, a second end (b) of the first switch Q1 is connected to a first end of the first inductor L1 and a first end (a) of the second switch Q2, and a control end (c) of the first switch Q1 is configured to input a first control signal. A second end of the first inductor L1 is an output end Vout of the second-stage voltage conversion circuit 22, the second end of the first inductor L1 is connected to a first end of the first capacitor C1, and a second end of the first capacitor C1 and a second end (b) of the second switch Q2 are grounded. A control end (c) of the second switch Q2 is configured to input a second control signal.

For example, switching frequencies of the first switch Q1 and the second switch Q2 in the second-stage voltage conversion circuit 22 may be greater than or equal to 30 MHz. Compared with that a switching frequency is generally less than 5 MHz in the conventional technology, a high switching frequency in this application cannot only satisfy the transient performance of the load change, but also enables that the circuit is more integrated. In addition, for a same inductor, a higher switching frequency indicates a shorter time period in which the switching transistor is turned on and a smaller ripple current in the circuit, therefore, a loss of the circuit is also lower.

Figure 5A:
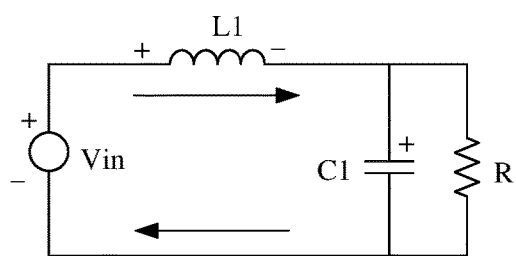
FIG. 5(a) and FIG. 5(b) is an equivalent circuit diagram of a second-stage voltage conversion circuit according to an embodiment of this application.
Figure 5B:
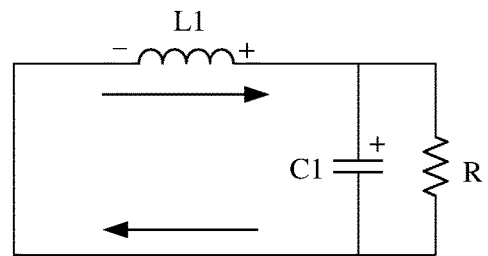

For example, when the first switch Q1 in the second-stage voltage conversion circuit 22 is turned on, the second switch Q2 is turned off; and when the second switch Q2 is turned on, the first switch Q1 is turned off. For example, if the first switch Q1 is turned on when the first control signal is at a high level, and the second switch Q2 is turned off when the second control signal is at a low level, the first control signal and the second control signal may be a pair of reverse pulse signals. When the first switch Q1 is turned on, the energy storage first inductor L1 is magnetized, and a current flowing through the first inductor L1 linearly increases; and the first capacitor C1 is charged at the same time, to supply energy to a load R. An equivalent circuit thereof is shown in FIG. 5(a). In this case, the first inductor L1 and the load R are connected in series to the input end Vin, and the output voltage Vout is a voltage at both ends of the load. Because the first inductor L1 and the load R are connected in series to divide a voltage, the output voltage Vout is definitely less than the input voltage Vin. When the first switch Q1 is turned off, the energy storage first inductor L1 is discharged by using the second switch Q2, and the current of the first inductor L1 linearly decreases. An equivalent circuit thereof is shown in FIG. 5(b). In this case, energy stored in the first inductor L1 is released to the load R, and a voltage of the first inductor L1 is less than the input voltage. Therefore, the output voltage at both the ends of the load R is also less than the input voltage Vin. The first switch Q1 and the second switch Q2 are turned on and turned off, so that the output voltage Vout is less than the input voltage Vin. For example, the output voltage may be adjusted by controlling a ratio of a time period in which the first switch Q1 is turned on/off to a time period in which the second switch Q2 is turned on/off.

It should be noted that the first switch Q1 and the second switch Q2 may be metal-oxide-semiconductor field effect transistors (MOSFET). For example, both the first switch Q1 and the second switch Q2 may be NMOS transistors; or both the first switch Q1 and the second switch Q2 may be PMOS transistors; or one of the first switch Q1 and the second switch Q2 may be a PMOS transistor, and the other is an NMOS transistor. This is not limited in this embodiment of this application. R in FIG. 4 represents the load of the wireless terminal device. In an actual application, the load of the wireless terminal device may be a circuit module with a specific function. A specific form of the load of the wireless terminal device is not limited in this embodiment of this application, and R is merely used as an example for description herein.

For example, to enable a board area occupied by and a volume of the first inductor in the second-stage voltage conversion circuit 22 to be relatively small when the first switch and the second switch work at high frequencies (greater than or equal to 30 MHz) and enable a loss of the first inductor to be relatively low, an embodiment of this application provides an inductor. When the switching frequencies of the first switch and the second switch are greater than or equal to 30 MHz, an inductance density of the inductor is greater than or equal to 10 nH/mm$^2$, the inductance density is greater than or equal to 40 nH/mm$^3$, and a coil direct current impedance of the inductor is less than or equal to 30 mΩ. It may be understood that, when the first inductor works at a high frequency, an inductance per unit area (per square millimeter) of the first inductor is greater than or equal to 10 nH, and an inductance per unit volume (per cubic millimeter) of the first inductor is greater than or equal to 40 nH. That is, the inductance per unit area and the inductance per unit volume of the first inductor are greatly improved compared with an inductance per unit area and an inductance per unit volume of an inductor in the conventional technology. Therefore, when the inductances are the same, both the board area occupied by the first inductor and the volume of the first inductor are relatively small. Therefore, the board area and a volume of the second-stage voltage conversion circuit 22 using the first inductor L1 are relatively small, and the circuit is more integrated. In addition, when the first switch and the second switch work at the high frequencies, an inductance of the first inductor is relatively large. Therefore, the ripple current in the circuit is relatively small, and the direct current impedance of the inductor is also relatively small. Therefore, the loss of the inductor is relatively low, so that power supply efficiency of the second-stage voltage conversion circuit is relatively high.

Figure 6:
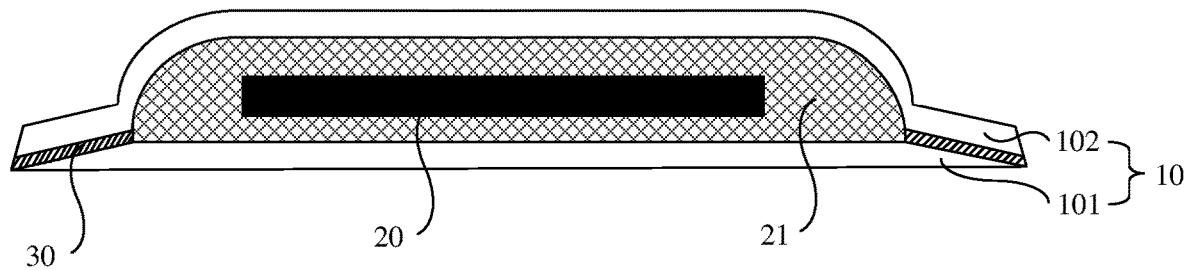
FIG. 6 is a schematic diagram of a structure of a film inductor according to an embodiment of this application.
Figure 7:
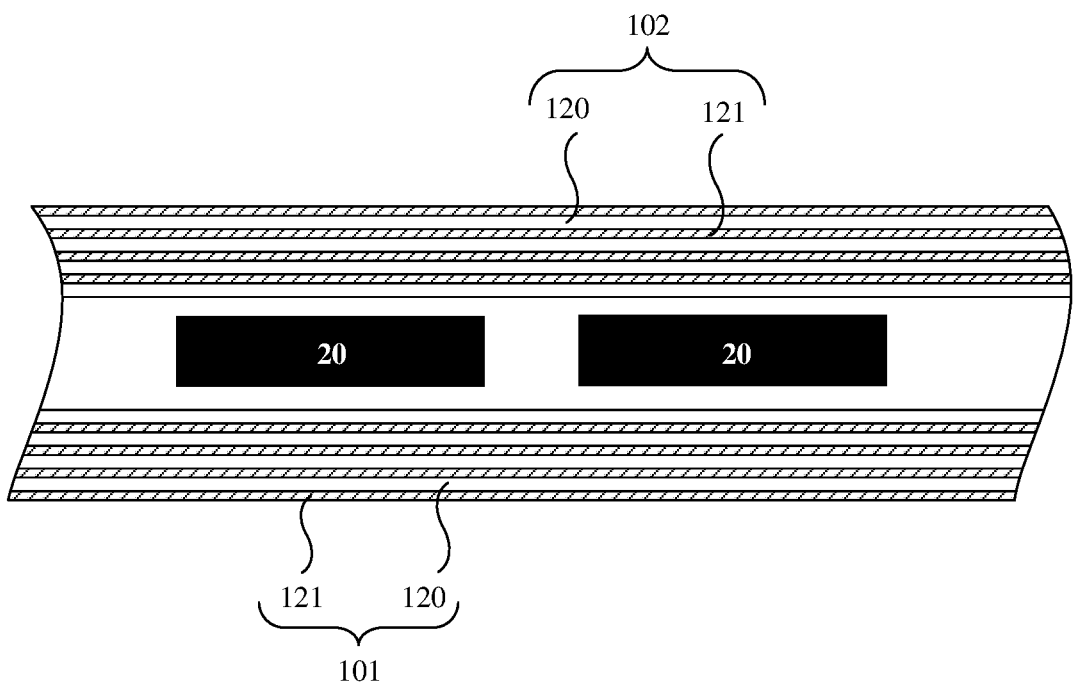
FIG. 7 is a schematic diagram 1 of a specific structure of a film inductor according to an embodiment of this application.
Figure 8:
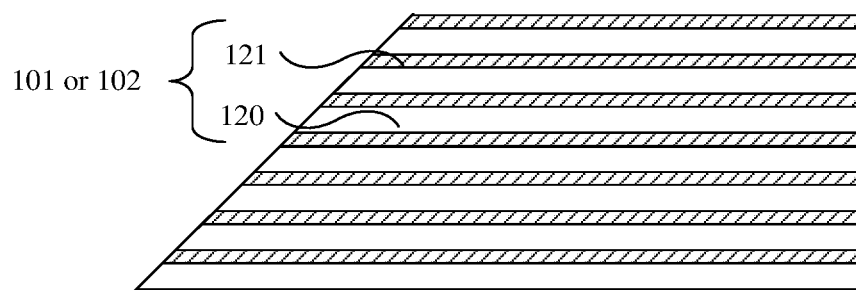
FIG. 8 is a schematic diagram 2 of a specific structure of a film inductor according to an embodiment of this application.

In an implementation, to enable the first inductor to be more integrated and enable the loss of the first inductor to be low, an embodiment of this application provides a film inductor 01. As shown in FIG. 6, the film inductor 01 includes at least one magnetic core 10 and a conductor 20 located in each magnetic core 10. Each magnetic core 10 includes a first magnetic film 101 and a second magnetic film 102 that are disposed opposite to each other. An accommodation cavity 21 is disposed between the first magnetic film 101 and the second magnetic film 102. The conductor 20 is located in the accommodation cavity 21. The film inductor 01 further includes an insulating isolation film 30. The insulating isolation film 30 is disposed on two sides of the conductor 20, and is located in a gap between the first magnetic film 101 and the second magnetic film 102. A lower surface and an upper surface of the insulating isolation film 30 are respectively in contact with the first magnetic film 101 and the second magnetic film 102. As shown in FIG. 7, the first magnetic film 101 and the second magnetic film 102 each include a plurality of layers of magnetic sub-films 120 and a plurality of layers of insulating sub-films 121. The magnetic sub-films 120 and the insulating sub-films 121 are alternately disposed in the first magnetic film 101. The magnetic sub-films 120 and the insulating sub-films 121 are alternately disposed in the second magnetic film 102. FIG. 8 is a schematic diagram of an inclined surface when the first magnetic film 101 is in contact with the insulating isolation film 30. The plurality of layers of magnetic sub-films 120 and the plurality of layers of insulating sub-films 121 in the first magnetic film 101 are exposed from the surface that is of the first magnetic film 101 and that is in contact with the insulating isolation film 30; and/or the plurality of layers of magnetic sub-films 120 and the plurality of layers of insulating sub-films 121 in the second magnetic film 102 are exposed from the surface that is of the second magnetic film 102 and that is in contact with the insulating isolation film 30.

With reference to the film inductor shown in FIG. 6 to FIG. 8, an eddy current at the insulating isolation film can intersect the exposed plurality of layers of magnetic sub-films and the exposed plurality of layers of insulating sub-films on the surface that is of the first magnetic film and that is in contact with the insulating isolation film, and/or the surface that is of the second magnetic film and that is in contact with the insulating isolation film. Therefore, the eddy current at the insulating isolation film is separated, at a position of a plane on which the eddy current is located and that intersects the layers of magnetic sub-films, into a plurality of sub-eddy currents by the layers of magnetic sub-films. Each sub-eddy current enters one layer of magnetic sub-film. Therefore, each sub-eddy current can be confined to one layer of magnetic sub-film, to reduce a loss of the eddy current. Therefore, after the second-stage voltage conversion circuit 22 uses the film inductor, the second-stage voltage conversion circuit 22 can be more integrated; and when the switches in the second-stage voltage conversion circuit 22 work at the high frequencies, the impedance of the first inductor in the second-stage voltage conversion circuit 22 is relatively small and the loss is low.

It may be understood that, when the input voltage of the second-stage voltage conversion circuit 22 is between 0.6 V and 1.3 V, the second-stage voltage conversion circuit 22 uses the buck circuit shown in FIG. 4, and the buck circuit occupies the relatively small board area and is more integrated. In addition, when the switching frequencies of the first switch and the second switch are greater than or equal to 30 MHz, it can be ensured that the loss of the circuit is relatively low, thereby improving power supply efficiency of the second-stage voltage conversion circuit 22.

Figure 9:
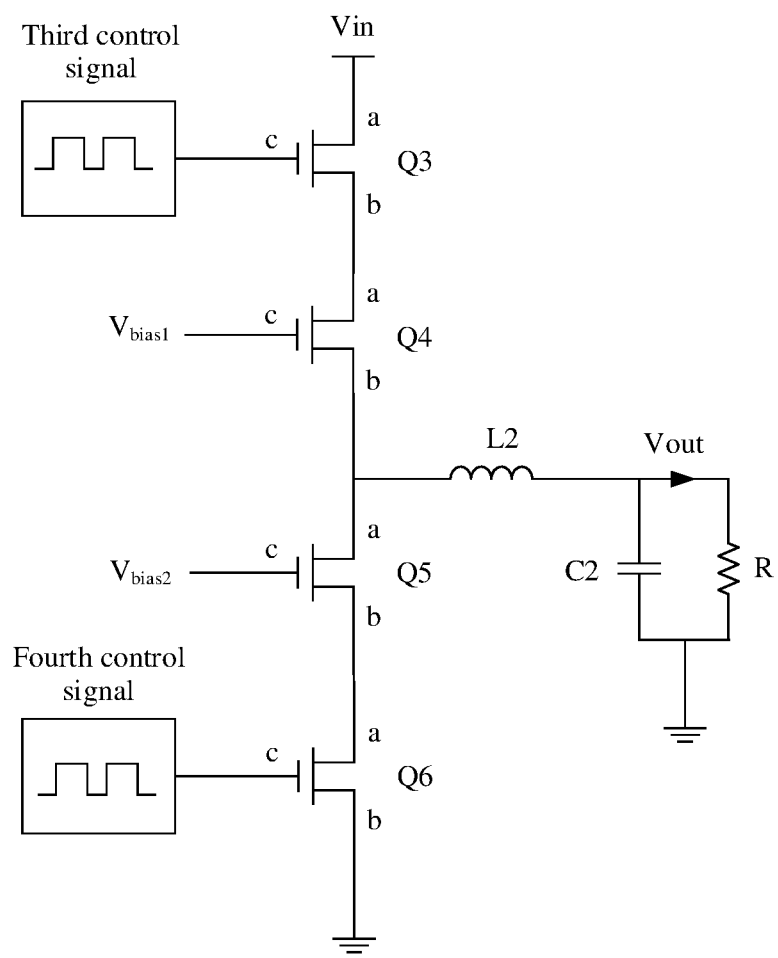
FIG. 9 is a circuit diagram of another second-stage voltage conversion circuit according to an embodiment of this application.

In another implementation, the second-stage voltage conversion circuit 22 may use a buck circuit shown in FIG. 9. As shown in FIG. 9, the buck circuit includes a second inductor L2, a second capacitor C2, a third switch Q3, a fourth switch Q4, a fifth switch Q5, and a sixth switch Q6. A first end (a) of the third switch Q3 is the input end of the second-stage voltage conversion circuit 22, and the first end (a) of the third switch Q3 is connected to the output end of the first-stage voltage conversion circuit 21. A second end (b) of the third switch Q3 is connected to a first end (a) of the fourth switch Q4, and a control end (c) of the third switch Q3 is configured to input a third control signal. A second end (b) of the fourth switch Q4 is connected to a first end of the second inductor L2 and a first end (a) of the fifth switch Q5, and a control end (c) of the fourth switch Q4 is configured to input a first bias voltage $V_{bias1}$. A second end (b) of the fifth switch Q5 is connected to a first end (a) of the sixth switch Q6, and a control end (c) of the fifth switch Q5 is configured to input a second bias voltage $V_{bias2}$. A second end of the second inductor L2 is the output end of the second-stage voltage conversion circuit 22, and the second end of the second inductor L2 is connected to a first end of the second capacitor C2. A second end of the second capacitor C2 and a second end (b) of the sixth switch Q6 are grounded. A control end (c) of the sixth switch Q6 is configured to input a fourth control signal.

For example, the first bias voltage $V_{bias1}$ and the second bias voltage $V_{bias2}$ may be preset bias voltages, so that gates of the fourth switch Q4 and the fifth switch Q5 remain at a fixed voltage. If the third switch Q3 and the fourth switch Q4 are PMOS transistors, the fifth switch Q5 and the sixth switch Q6 are NMOS transistors, when the third switch Q3 is turned on, the fourth switch Q4 is also turned on, and in this case, both the fifth switch Q5 and the sixth switch Q6 are turned off. When the third switch Q3 is turned off, the fourth switch Q4 is also turned off, and in this case, both the fifth switch Q5 and the sixth switch Q6 are turned on.

It should be noted that the third switch Q3, the fourth switch Q4, the fifth switch Q5, and the sixth switch Q6 may be NMOS transistors, or may be PMOS transistors. This is not limited in this embodiment of this application. The fifth switch Q5 and the sixth switch Q6 are turned off when the third switch Q3 and the fourth switch Q4 are turned on; and the third switch Q3 and the fourth switch Q4 are turned off when the fifth switch Q5 and the sixth switch Q6 are turned on. For example, both the third switch Q3 and the fourth switch Q4 may be PMOS transistors, and both the fifth switch Q5 and the sixth switch Q6 are NMOS transistors. R in FIG. 9 represents the load of the wireless terminal device. In an actual application, the load of the wireless terminal device may be the circuit module with the specific function. The specific form of the load of the wireless terminal device is not limited in this embodiment of this application, and R is merely used as an example for description herein.

It may be understood that when the second-stage voltage conversion circuit 22 uses the buck circuit shown in FIG. 9, the second inductor in the circuit may use the inductor shown in FIG. 6 to FIG. 8. Therefore, when the switching frequencies of the first switch and the second switch are greater than or equal to 30 MHz, it is ensured that area and the volume of the inductor are relatively small, the loss of the inductor is low, and power supply efficiency of the second-stage voltage conversion circuit 22 is relatively high. It should be noted that, the buck circuit in FIG. 4 uses the two switching transistors, and the buck circuit in FIG. 9 uses the four switching transistors, therefore, compared with when the second-stage voltage conversion circuit 22 uses the buck circuit shown in FIG. 9, when the second-stage voltage conversion circuit 22 uses the buck circuit shown in FIG. 4, the output voltage of the first-stage voltage conversion circuit 21 is lower and conversion efficiency is higher. In addition, the buck circuit shown in FIG. 4 requires a relatively small quantity of switching transistors, and therefore, the circuit is more integrated.

Figure 10:
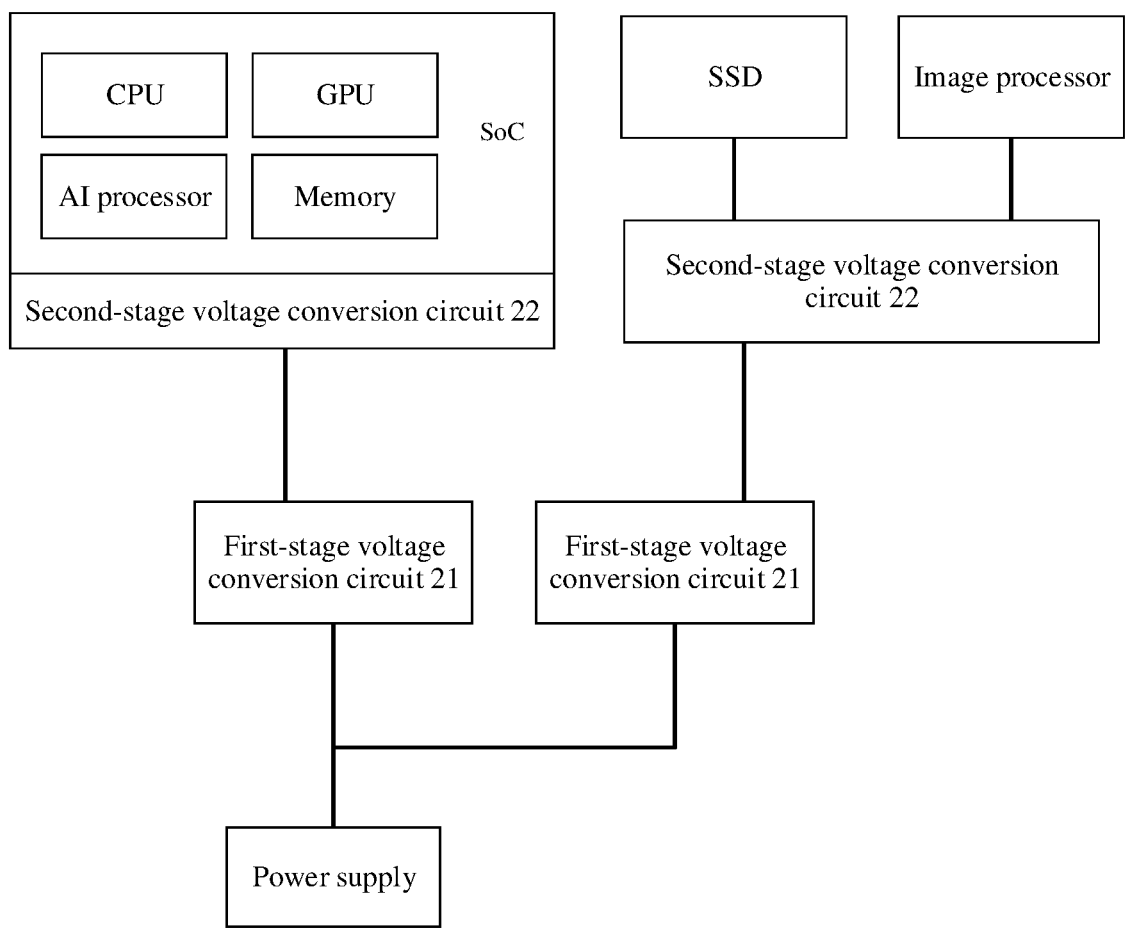
FIG. 10 is a schematic diagram of a structure of another power supply circuit according to an embodiment of this application.

In an implementation, the second-stage voltage conversion circuit 22 in the power supply circuit 20 may be integrated with the load. For example, as shown in FIG. 10, the second-stage voltage conversion circuit 22 may be integrated with a system on chip (SoC), to supply power to the system on chip. The system on chip may include a CPU, a GPU, an AI processor, a memory, and the like. In this implementation, the first-stage voltage conversion circuit 21 and the second-stage voltage conversion circuit 22 may be in different chips. For example, a first chip includes the first-stage voltage conversion circuit 21, and a second chip includes the second-stage voltage conversion circuit 22. The second chip may be a processor chip in which the second-stage voltage conversion circuit is integrated.

Figure 11:
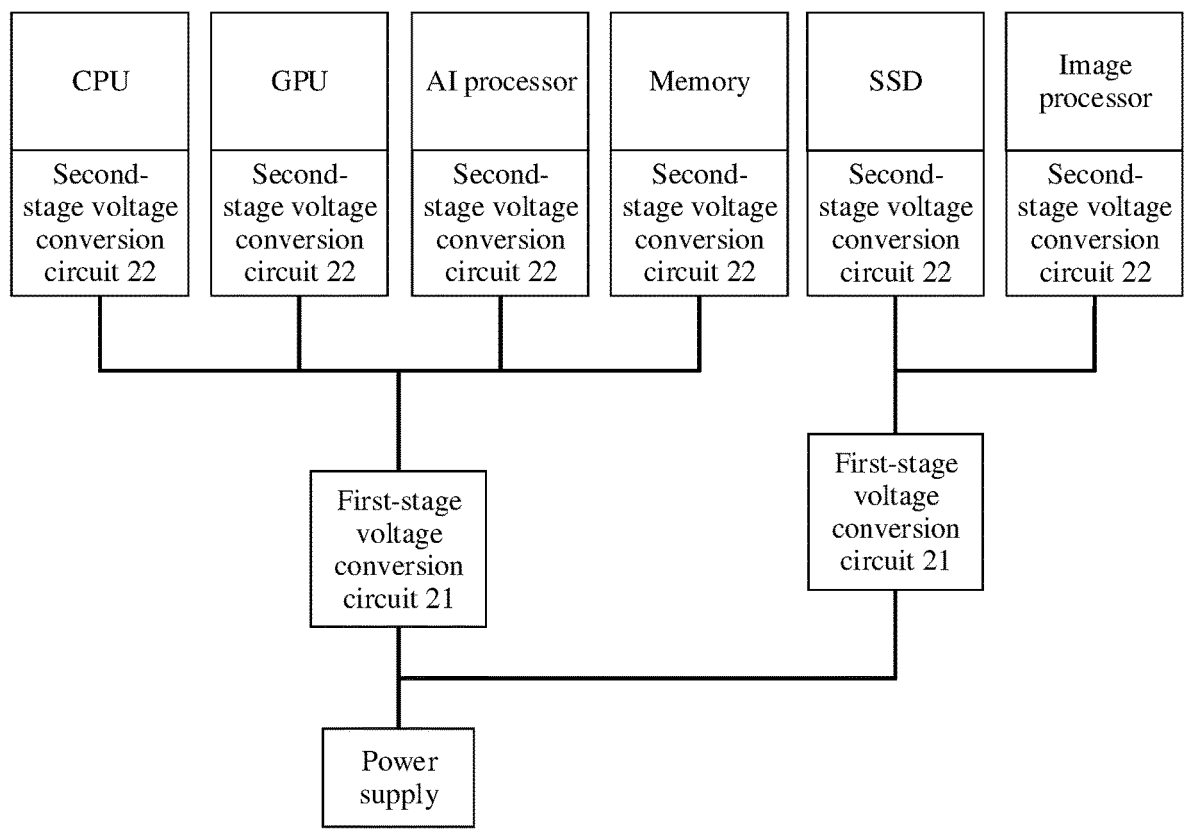
FIG. 11 is a schematic diagram of a structure of another power supply circuit according to an embodiment of this application.

For example, as shown in FIG. 11, because voltage requirements of different loads are different, to refine power supply management and improve power supply efficiency, a plurality of second-stage voltage conversion circuits 22 may supply power to different loads (for example, the CPU, the GPU, the AI processor, and the memory). In addition, the second-stage voltage conversion circuit 22 provided in this application is the high-frequency switch circuit, and the board area occupied by the second-stage voltage conversion circuit 22 and the volume of the second-stage voltage conversion circuit 22 are small. Therefore, the second-stage voltage conversion circuit 22 may be integrated with the load to which the second-stage voltage conversion circuit 22 supplies power, so that the power supply circuit is more integrated and has a higher power density.

Figure 12:
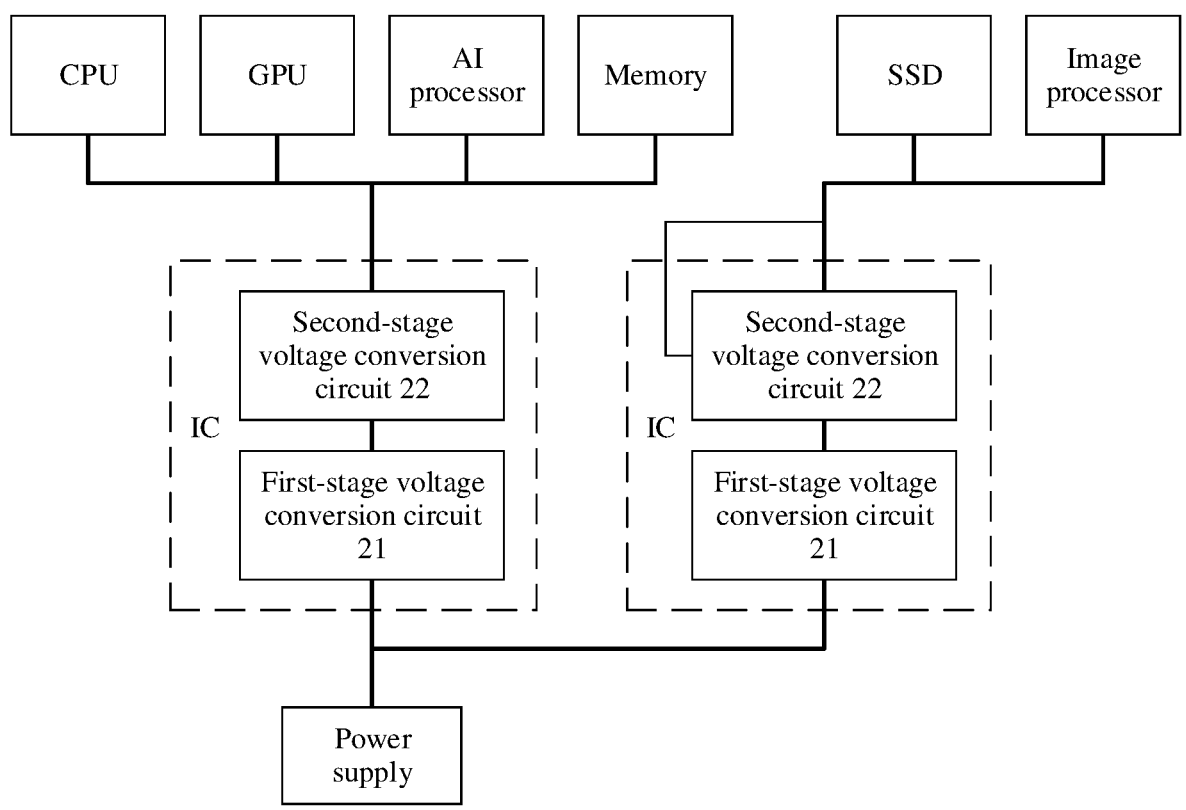
FIG. 12 is a schematic diagram of a structure of another power supply circuit according to an embodiment of this application.

In an implementation, as shown in FIG. 12, the first-stage voltage conversion circuit 21 in the power supply circuit 20 and the second-stage voltage conversion circuit 22 may be integrated into an integrated circuit (IC).

It may be understood that, because the processor chip of the network device uses the advanced CMOS whose process node is 5 nm, 7 nm, or the like in the manufacturing procedure, the power supply voltage of the processor chip may be reduced to about 0.6 V. A low-voltage bus architecture (a voltage bus architecture in a range from 0.6 V to 1.3 V) in this embodiment of this application is used, so that conversion efficiency of the circuit can be effectively improved, and power supply efficiency is relatively high. In addition, with reference to a high-frequency switching technology, the area occupied by the power supply and a volume of the power supply can be further reduced, and the power density is greatly improved compared with that in the conventional technology.

The power supply circuit provided in this embodiment of this application supplies power to the load by using the circuit with the first-stage voltage conversion circuit and the second-stage voltage conversion circuit. The first-stage voltage conversion circuit may convert the power supply voltage into the output voltage about 1.1 V (in a range from 0.6 V to 1.3 V), and use the output voltage as the input of the second-stage voltage conversion circuit. In addition, the high-frequency second-stage voltage conversion circuit performs voltage step-down on the voltage to supply power to the load, so that when the power supply voltage of the load is relatively low, conversion efficiency of the second-stage voltage conversion circuit can be improved. The second-stage voltage conversion circuit 22 is the high-frequency switch circuit, and a working frequency of the second-stage voltage conversion circuit 22 is far higher than that of a conventional power supply circuit. Therefore, the board area occupied by the power supply circuit can be greatly reduced while ensuring that the transient performance requirement of the load change is satisfied. In addition, compared with that each voltage conversion circuit needs to be designed based on the maximum peak current of the load in the conventional technology, in this application, the peak power of the first-stage voltage conversion circuit 21 may be designed to be less than the peak power of the one second-stage voltage conversion circuit 22 connected to the first-stage voltage conversion circuit 21 or the sum of the peak powers of the plurality of second-stage voltage conversion circuits 22 connected to the first-stage voltage conversion circuit 21. Therefore, this can prevent the peak power of the first-stage voltage conversion circuit 21 from being designed to be extremely large, the board area occupied by the power supply circuit is further reduced, and the power density of the power supply circuit is improved.

An embodiment of this application further provides an integrated circuit system. The integrated circuit system includes a first chip and a second chip, the first chip includes the first-stage voltage conversion circuit 21, and the second chip includes the second-stage voltage conversion circuit 22.

For example, the second chip in the integrated circuit system may be a processor chip, and the first chip is a power supply chip that supplies power to the processor chip. For example, the second chip may be a processor chip in which the second-stage voltage conversion circuit 22 is integrated, and the first-stage voltage conversion circuit 21 of the first chip may supply power to the second chip. It may be understood that for related descriptions of the first-stage voltage conversion circuit 21 and the second-stage voltage conversion circuit 22, refer to content in the foregoing embodiments. Details are not described herein again.

Figure 13:
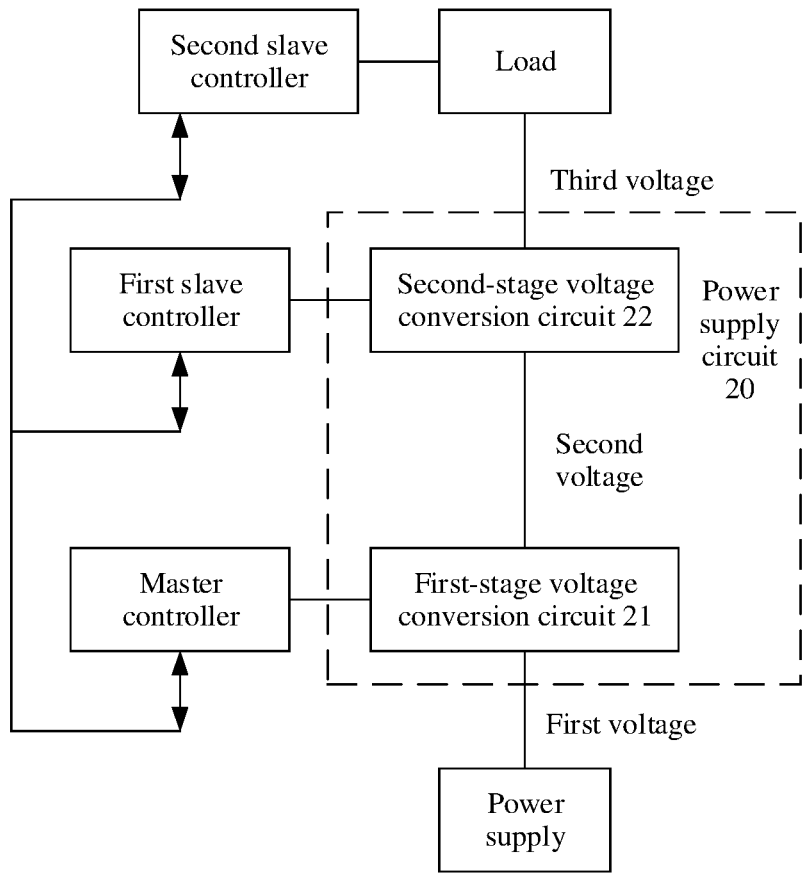
FIG. 13 is a schematic diagram of a structure of a power supply system according to an embodiment of this application.
Figure 14:
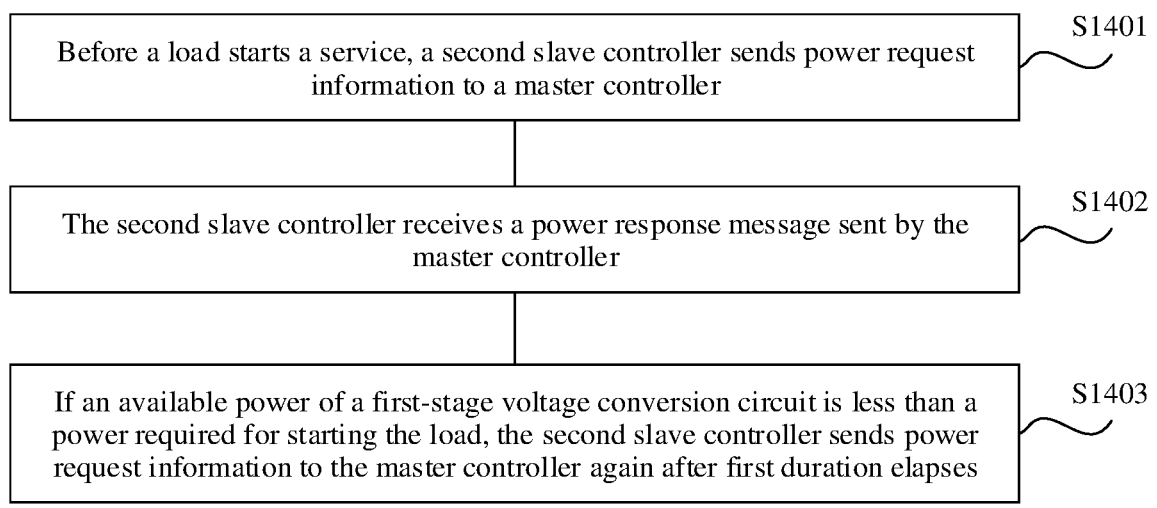
FIG. 14 is a schematic flowchart of a power supply control method according to an embodiment of this application.

An embodiment of this application further provides a power supply control method, where the method is applied to a power supply system shown in FIG. 13. The power supply system includes the power supply circuit 20 shown in FIG. 7, a master controller connected to the first-stage voltage conversion circuit 21, a first slave controller connected to the second-stage voltage conversion circuit 22, and a second slave controller connected to the load. The master controller, the first slave controller, and the second slave controller are connected through a control bus. As shown in FIG. 14, the power supply control method may include steps S1401 to S1403.

S1401: Before the load starts a service, the second slave controller sends power request information to the master controller.

The power request information is used to request an available power of the first-stage voltage conversion circuit 21. The available power is a maximum output power of the first-stage voltage conversion circuit minus a sum of current output powers of all the second-stage voltage conversion circuits 22 connected to the first-stage voltage conversion circuit 21. For example, the maximum output power of the first-stage voltage conversion circuit may be a preset value.

For example, the second-stage voltage conversion circuit 22 that supplies power to the load connected to the second slave controller is connected to the first-stage voltage conversion circuit 21. In this embodiment of this application, the peak power of the first-stage voltage conversion circuit 21 is less than the sum of the peak powers of all the second-stage voltage conversion circuits 22 connected to the first-stage voltage conversion circuit 21. Therefore, before the second-stage voltage conversion circuit 22 draws a current from the first-stage voltage conversion circuit 21 to supply power to the load, the available power of the first-stage voltage conversion circuit 21 may be requested first.

S1402: The second slave controller receives a power response message sent by the master controller.

The power response message carries the available power of the first-stage voltage conversion circuit 21.

If the available power of the first-stage voltage conversion circuit 21 is greater than or equal to a power required for starting the load, when it is determined that the load is started, the current may be drawn from the first-stage voltage conversion circuit 21 to supply power to the load. If the available power of the first-stage voltage conversion circuit 21 is less than the power required for starting the load, it is determined that the output power of the first-stage voltage conversion circuit is relatively large and the available power of the first-stage voltage conversion circuit is insufficient to supply power for starting the load, and step S1403 may be performed.

S1403: If the available power of the first-stage voltage conversion circuit is less than the power required for starting the load, the second slave controller sends power request information to the master controller again after first duration elapses.

For example, when the available power of the first-stage voltage conversion circuit 21 is insufficient for starting the load, the power request information may be sent to the main controller again after the first duration elapses, until the available power of the first-stage voltage conversion circuit 21 is greater than or equal to the power required for starting the load, and then the load is started.

It may be understood that, in this embodiment of this application, the peak power of the first-stage voltage conversion circuit 21 is less than the sum of the peak powers of all the second-stage voltage conversion circuits 22 connected to the first-stage voltage conversion circuit 21. Therefore, when the output power of the first-stage voltage conversion circuit 21 is limited, a plurality of peak services can be staggered by using a maximum power limit mechanism in steps S1401 to S1403, to reduce energy lost on an internal resistance of the power supply, and improve efficiency of the power supply system.

Figure 15:
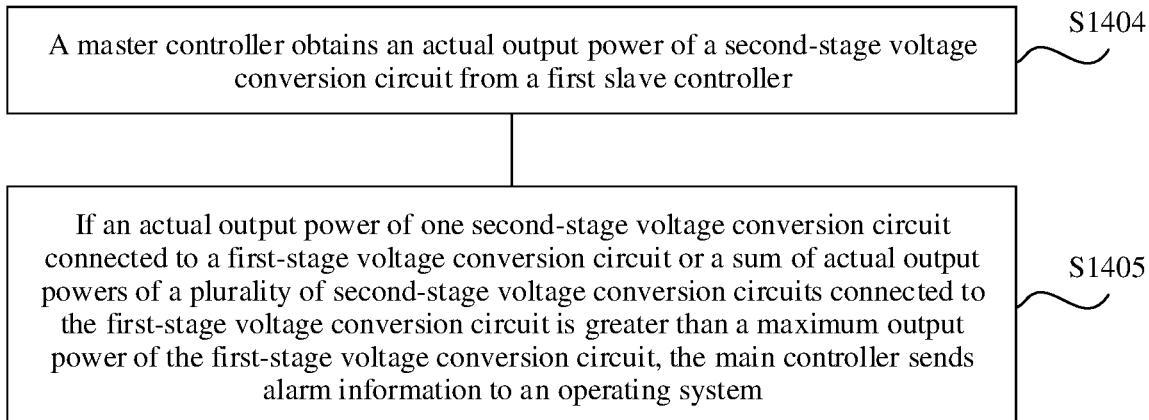
FIG. 15 is a schematic flowchart of another power supply control method according to an embodiment of this application.

An embodiment of this application further provides a power supply control method. In FIG. 15, after steps S1401 to S1403, steps S1404 and S1405 are further included. S1401 to S1403 are not shown in FIG. 15.

S1404: The master controller obtains a current output power of a second-stage voltage conversion circuit from the first slave controller.

For example, the master controller may obtain a current output power of each second-stage voltage conversion circuit 22 connected to the first slave controller from the first slave controller.

S1405: If the current output power of the one second-stage voltage conversion circuit connected to the first-stage voltage conversion circuit or the sum of the current output powers of the plurality of second-stage voltage conversion circuits connected to the first-stage voltage conversion circuit is greater than the maximum output power of the first-stage voltage conversion circuit, the main controller sends alarm information to an operating system.

For example, based on the maximum power limit mechanism in steps S1401 to S1403, generally, the maximum output power of the first-stage voltage conversion circuit 21 is greater than or equal to the sum of the output powers of all the second-stage voltage conversion circuits 22 connected to the first-stage voltage conversion circuit 21. However, if the load is short-circuited or another abnormality occurs, the current output power of the one second-stage voltage conversion circuit 22 connected to the first-stage voltage conversion circuit 21 or the sum of the current output powers of the plurality of second-stage voltage conversion circuits 22 connected to the first-stage voltage conversion circuit 21 may be greater than the maximum output power of the first-stage voltage conversion circuit 21. In this case, the main controller sends the alarm information to the operating system. The operating system may handle the abnormality that the power exceeds by using a preset power management policy.

According to the power supply control method provided in this embodiment of this application, the plurality of peak services can be staggered by using the maximum power limit mechanism, to reduce the energy lost on the internal resistance of the power supply, and improve efficiency of the power system. In addition, the alarm information can be sent when the sum of the output powers of the plurality of second-stage voltage conversion circuits 22 connected to the first-stage voltage conversion circuit 21 is higher than the maximum output power of the first-stage voltage conversion circuit 21.

Figure 16:
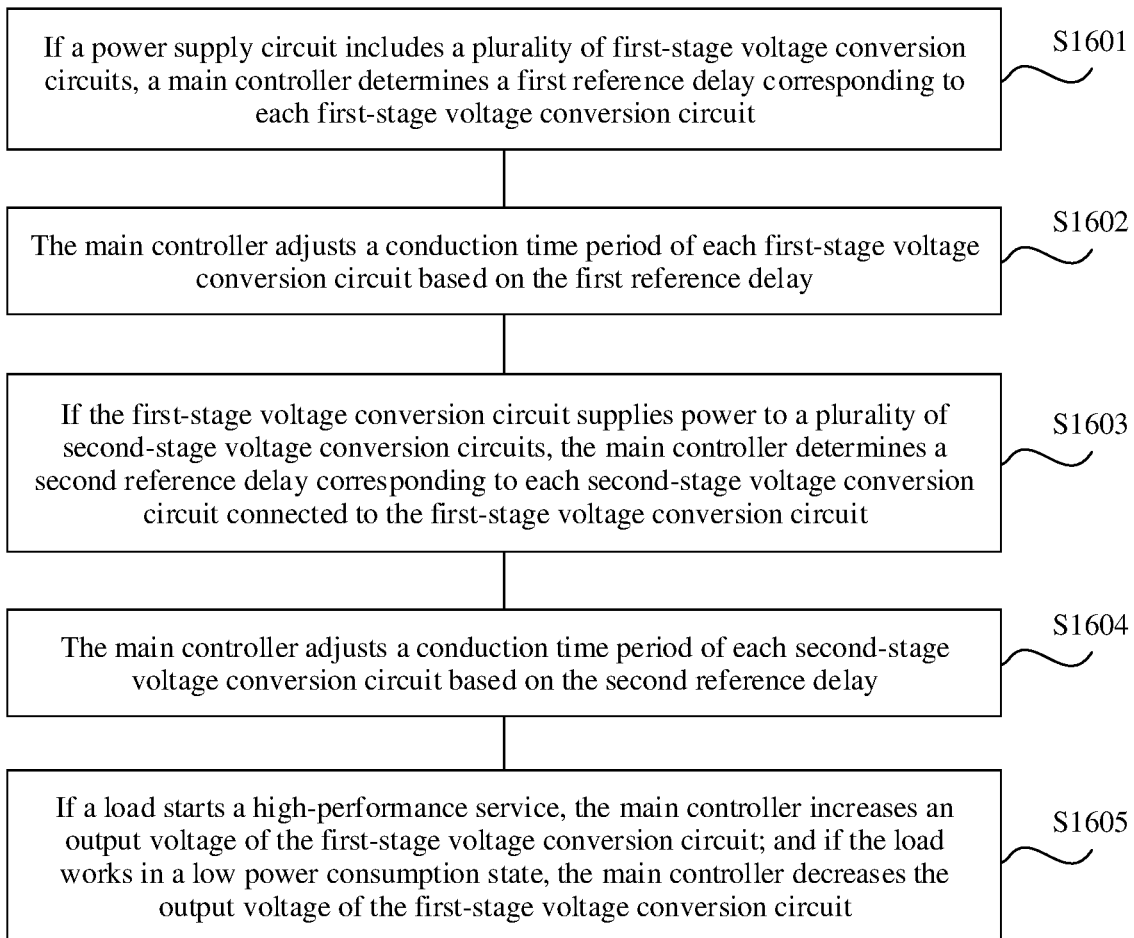
FIG. 16 is a schematic flowchart of another power supply control method according to an embodiment of this application.

An embodiment of this application further provides a power supply control method, where the method is applied to the power system shown in FIG. 13, and the power system further includes a delay circuit. As shown in FIG. 16, the power supply control method may further include S1601 to S1605.

S1601: If the power supply circuit includes a plurality of first-stage voltage conversion circuits, the main controller determines a first reference delay corresponding to each first-stage voltage conversion circuit.

The first reference delay is a delay corresponding to each first-stage voltage conversion circuit 21 when a ripple amplitude of the first voltage is the smallest. It may be understood that the first reference delay may be obtained according to an algorithm obtained through training. A specific method for obtaining the first reference delay is not limited in this embodiment of this application.

For example, if switching transistors of the plurality of first-stage voltage conversion circuits 21 are turned on at the same time, a very large transient current is generated, resulting in a very large voltage ripple of the power supply. Therefore, the delay corresponding to each first-stage voltage conversion circuit 21 may be determined when the ripple amplitude of the power supply voltage (the first voltage) is the smallest. In this way, the switching transistors of the plurality of first-stage voltage conversion circuits 21 can be staggered (staggeredly turned on), to reduce the voltage ripple.

For example, the algorithm obtained through training may include: The master controller configures, based on a system reference clock and the delay circuit, a delay for turning on or turning off the switching transistor in each first-stage voltage conversion circuit 21; and determines that the delay corresponding to the first-stage voltage conversion circuit 21 is the first reference delay when the ripple amplitude of the first voltage is the smallest.

For example, the delay circuit may be a delay lock loop or a module with a similar function, and a delay line may be configured in each second-stage voltage conversion circuit 22.

S1602: The main controller adjusts a conduction time period of each first-stage voltage conversion circuit based on the first reference delay.

It may be understood that the conduction time period of each first-stage voltage conversion circuit may be adjusted based on the first reference delay determined in step S1601, so that time periods in which the switching transistors of the plurality of first-stage voltage conversion circuits 21 included in the power supply system are turned on can be staggered, to reduce the voltage ripple of the power supply. For example, when the plurality of loads are started, if the second-stage voltage conversion circuit 22 that supplies power to the plurality of load modules is connected to the plurality of first-stage voltage conversion circuits 21, the time periods in which the switching transistors of the plurality of first-stage voltage conversion circuits 21 are turned on can be staggered based on the first reference delay, to reduce the voltage ripple of the power supply.

S1603: If the first-stage voltage conversion circuit supplies power to a plurality of second-stage voltage conversion circuits, the main controller determines a second reference delay corresponding to each second-stage voltage conversion circuit connected to the first-stage voltage conversion circuit.

The second reference delay is a delay corresponding to each second-stage voltage conversion circuit 22 when a ripple amplitude of the second voltage is the smallest.

For example, when the first-stage voltage conversion circuit supplies power to the plurality of second-stage voltage conversion circuits, in other words, when input ends of the plurality of second-stage voltage conversion circuits 22 are connected to the output end of the first-stage voltage conversion circuit 21, if switching transistors of the plurality of second-stage voltage conversion circuits 22 are turned on at the same time, a very large transient current is generated, thereby resulting in a large voltage ripple in the output voltage of the first-stage voltage conversion circuit 21. Therefore, the delay corresponding to each second-stage voltage conversion circuit 22 when the ripple amplitude of the output voltage (the second voltage) of the first-stage voltage conversion circuit 21 is the smallest may be determined by using the algorithm obtained through training, so that the switching transistors of the plurality of second-stage voltage conversion circuits 22 can be staggered (staggeredly turned on), to reduce the voltage ripple.

For example, the master controller configures, based on the system reference clock and the delay circuit, a delay for turning on or turning off the switch in each second-stage voltage conversion circuit 22; and determines that the delay corresponding to the second-stage voltage conversion circuit 22 is the second reference delay when the ripple amplitude of the second voltage is the smallest.

S1604: The main controller adjusts a conduction time period of each second-stage voltage conversion circuit based on the second reference delay.

It may be understood that, conduction time periods of the plurality of second-stage voltage conversion circuits connected to one first-stage voltage conversion circuit may be adjusted based on the second reference delay determined in step S1603, so that time periods in which the switching transistors of the plurality of second-stage voltage conversion circuits 22 are turned on can be staggered, to reduce the voltage ripple of the output voltage of the first-stage voltage conversion circuit 21 and improve power supply efficiency of the power supply system. For example, when the plurality of loads are started, if the second-stage voltage conversion circuits 22 that supply power to the plurality of load modules are connected to a same first-stage voltage conversion circuit 21, the time periods in which the switching transistors of the plurality of second-stage voltage conversion circuits 22 are turned on can be staggered based on the second reference delay, to reduce the voltage ripple of the power supply.

(Optional) S1605: If the load starts a high-performance service, the main controller increases the output voltage of the first-stage voltage conversion circuit; and if the load works in a low power consumption state, the main controller decreases the output voltage of the first-stage voltage conversion circuit.

For example, when the load runs a low power consumption service, the output voltage of the first-stage voltage conversion circuit 21 may be reduced, to improve efficiency of the second-stage voltage conversion circuit 22, and power supply efficiency is relatively high. When the load runs the high-performance service, the output voltage of the first-stage voltage conversion circuit 21 may be increased, so that the load normally runs the high-performance service. In this way, the output voltage of the first-stage voltage conversion circuit can be adjusted when the load runs different services, to satisfy service requirements in different cases.

According to the power supply control method provided in this embodiment of this application, the time periods in which the switching transistors of the plurality of first-stage voltage conversion circuits 21 are turned on can be staggered, and the time periods in which the switching transistors of the plurality of second-stage voltage conversion circuits 22 connected to the same first-stage voltage conversion circuit 21 are turned on can be staggered, to reduce the voltage ripple of the power supply. In addition, the output voltage of the first-stage voltage conversion circuit 21 is increased when the load runs the high-performance service, and the output voltage of the first-stage voltage conversion circuit 21 is decreased when the load is in the low power consumption state, so that power supply efficiency of the power system is higher.

An embodiment of this application further provides a terminal device. The terminal device includes the power supply circuit 20.

Figure 17:
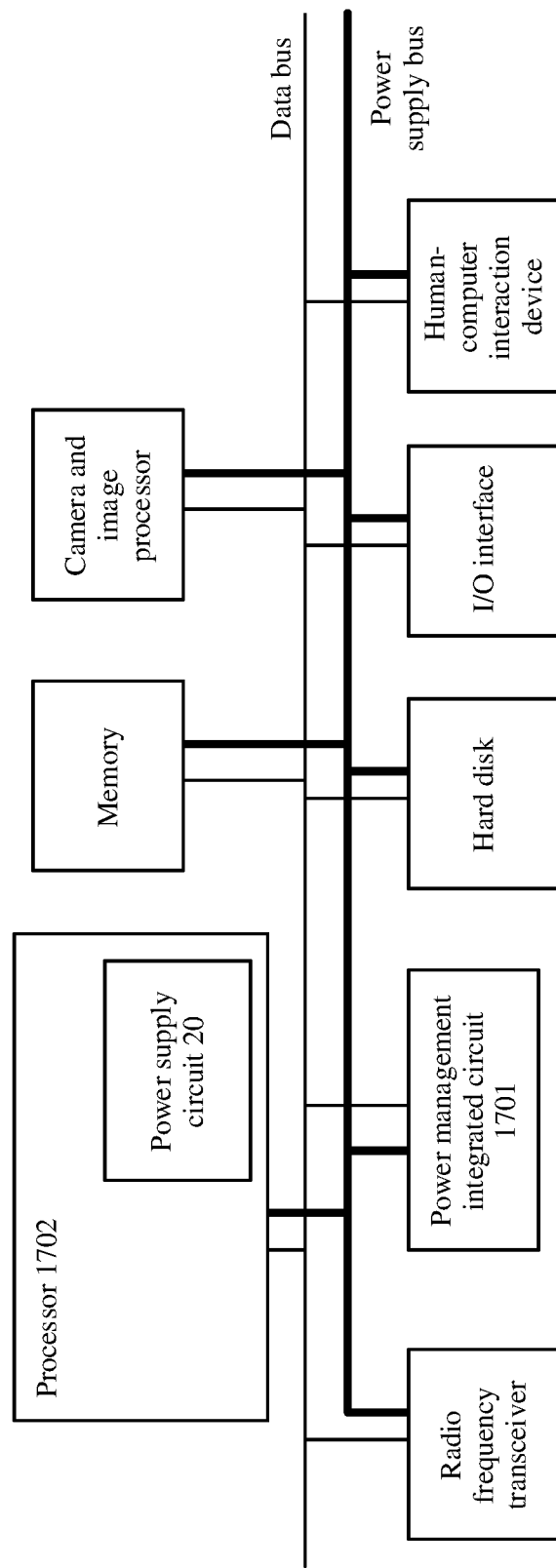
FIG. 17 is a schematic diagram of a structure of a terminal device according to an embodiment of this application.

Optionally, as shown in FIG. 17, the terminal device may further include a power management integrated circuit 1701, and a power supply bus or a power supply network connected to the power management integrated circuit 1701. The power management integrated circuit 1701 may supply an operating voltage to other components in the terminal device, for example, a radio frequency transceiver, a memory, a hard disk, a camera, an image processor, an input/output (I/O) interface, and a human-computer interaction device, through the power supply bus.

For example, the terminal device further includes a processor 1702, and a data bus connected to the processor 1702. The processor 1702 includes the power supply circuit 20. The processor 1702 may supply an operating voltage to the other components in the terminal device, for example, the radio frequency transceiver, the memory, the hard disk, the camera, the image processor, the input/output interface, and the human-computer interaction device, through the data bus. The processor 1702 may be any one of an SoC, a CPU, or a GPU.

A technical effect of the terminal device is the same as that of the power supply circuit 20 provided in the foregoing embodiments, and details are not described herein again.

An embodiment of this application further provides a computer storage medium. The computer storage medium stores computer program code. When the computer program code is run on a processor, the processor is enabled to perform S1401 to S1403 in FIGS. 14, S1404 and S1405 in FIG. 15, or S1601 to S1605 in FIG. 16. For example, the processor may be a CPU; and a master controller and a slave controller may be other processors, digital logic modules, or function modules in the CPU. This is not limited in this embodiment of this application.

It may be understood that to implement the foregoing functions, the terminal device includes corresponding hardware structures and/or software modules for performing the functions. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions for each particular application, but it should not be considered that the implementation goes beyond the scope of this application.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may alternatively be a component of the processor. The processor and the storage medium may be located in an ASIC. In addition, the ASIC may be located in an interface device of a core network. Certainly, the processor and the storage medium may alternatively exist in the interface device of the core network as discrete components.

A person skilled in the art should be aware that in one or more of the foregoing examples, the functions described in this application may be implemented by using hardware, software, firmware, or any combination thereof. When the software is used to implement the functions, the functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or special-purpose computer.

The objectives, the technical solutions, and the benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:
1. A power supply circuit comprising:
one or a plurality of first-stage voltage conversion circuits, an input end of the first-stage voltage conversion circuit being coupled to a power supply node, the first-stage voltage conversion circuit being configured to
convert a first voltage received at the input end into a second voltage, and
output the second voltage from an output end of the first-stage voltage conversion circuit, the second voltage being less than the first voltage, and the second voltage being greater than or equal to 0.6 V and less than or equal to 1.3 V; and
one or a plurality of second-stage voltage conversion circuits, an input end of the second-stage voltage conversion circuit being coupled to the output end of the first-stage voltage conversion circuit, the second-stage voltage conversion circuit being configured to convert the second voltage into a third voltage, and supply the third voltage to a load, wherein the third voltage is less than the second voltage, and a switching frequency of the second-stage voltage conversion circuit is greater than or equal to 30 MHz.

2. The power supply circuit according to claim 1, wherein when one first-stage voltage conversion circuit supplies power to the one or the plurality of second-stage voltage conversion circuits, an input end of each second-stage voltage conversion circuit is connected to an output end of the first-stage voltage conversion circuit.

3. The power supply circuit according to claim 2, wherein the second-stage voltage conversion circuit comprises an inductor, a capacitor, a first switch, and a second switch; a first end of the first switch is coupled to the output end of the first-stage voltage conversion circuit, a second end of the first switch is coupled to a first end of the inductor and a first end of the second switch, and a control end of the first switch is configured to input a first control signal; a second end of the inductor is an output end of the second-stage voltage conversion circuit, the second end of the inductor is coupled to a first end of the capacitor, and a second end of the capacitor and a second end of the second switch are coupled to a ground node; a control end of the second switch is configured to input a second control signal; and switching frequencies of the first switch and the second switch are greater than or equal to 30 MHz.

4. The power supply circuit according to claim 3, wherein when the switching frequencies of the first switch and the second switch are greater than or equal to 30 MHz, an inductance density of the inductor is greater than or equal to 10 nH/mm$^2$, the inductance density of the inductor is greater than or equal to 40 nH/mm$^3$, and a coil direct current impedance of the inductor is less than or equal to 30 m Ω.

5. The power supply circuit according to claim 3, wherein the inductor is a film inductor, the film inductor comprising
   a magnetic core comprising a first magnetic film and a second magnetic film,
   an accommodation cavity disposed between the first magnetic film and the second magnetic film;
   a conductor located in the accommodation cavity; and
   an insulating isolation film disposed on two sides of the conductor and located between the first magnetic film and the second magnetic film, the insulating isolation film being in contact with the first magnetic film and the second magnetic film;
   the first magnetic film and the second magnetic film each comprise a plurality of layers of magnetic sub-films and a plurality of layers of insulating sub-films;
   the magnetic sub-films and the insulating sub-films are alternately disposed in the first magnetic film;
   the magnetic sub-films and the insulating sub-films are alternately disposed in the second magnetic film; and
   the plurality of layers of magnetic sub-films and the plurality of layers of insulating sub-films in the first magnetic film are exposed from a surface that is of the first magnetic film and that is in contact with the insulating isolation film, or
   the plurality of layers of magnetic sub-films and the plurality of layers of insulating sub-films in the second magnetic film are exposed from a surface that is of the second magnetic film and that is in contact with the insulating isolation film.

6. The power supply circuit according to claim 1, wherein the one or the plurality of first-stage voltage conversion circuits supply power to a single one of the second-stage voltage conversion circuits, and wherein a peak power of the first-stage voltage conversion circuit is less than a peak power of the one second-stage voltage conversion circuit coupled to the first-stage voltage conversion circuit.

7. The power supply circuit according to claim 1, wherein the first-stage voltage conversion circuit is a switched-capacitor voltage conversion circuit, a switched-capacitor voltage conversion circuit with a variable conversion ratio, a buck DC-DC conversion circuit, a multi-level buck conversion circuit, a transformer-isolated buck conversion circuit, a hybrid voltage conversion circuit in which a switched inductor and a switched capacitor are combined, or a resonant switched-capacitor voltage conversion circuit.

8. The power supply circuit according to claim 1, wherein the second-stage voltage conversion circuit is integrated with the load.

9. The power supply circuit according to claim 3, wherein when the first switch is turned on, the second switch is turned off; and when the second switch is turned on, the first switch is turned off.

10. The power supply circuit according to claim 1, wherein a peak power of the first-stage voltage conversion circuit is less than a sum of peak powers of the plurality of second-stage voltage conversion circuits coupled to the first-stage voltage conversion circuit.

11. An integrated circuit system comprising:
    a first chip comprising a first-stage voltage conversion circuit;
    an input end of the first-stage voltage conversion circuit coupled to a power supply node, the first-stage voltage conversion circuit being configured to
    convert a first voltage received at the input end into a second voltage, and
    output the second voltage from an output end of the first-stage voltage conversion circuit, the second voltage being less than the first voltage, and the second voltage being greater than or equal to 0.6 V and less than or equal to 1.3 V;
    a second chip comprising a second-stage voltage conversion circuit; and
    an input end of the second-stage voltage conversion circuit coupled to the output end of the first-stage voltage conversion circuit, the second-stage voltage conversion circuit being configured to
    convert the second voltage into a third voltage, and
    supply the third voltage to a load, wherein the third voltage is less than the second voltage, and a switching frequency of the second-stage voltage conversion circuit is greater than or equal to 30 MHz.

12. The integrated circuit system according to claim 11, wherein the second chip is a processor chip, and the first chip is a power supply chip that supplies power to the processor chip.

13. The integrated circuit system according to claim 11, wherein:
    the second-stage voltage conversion circuit comprises an inductor, a capacitor, a first switch, and a second switch;
    a first end of the first switch is coupled to the output end of the first-stage voltage conversion circuit,
    a second end of the first switch is coupled to a first end of the inductor and a first end of the second switch, and
    a control end of the first switch is configured to input a first control signal;

a second end of the inductor is an output end of the second-stage voltage conversion circuit, the second end of the inductor is coupled to a first end of the capacitor, and a second end of the capacitor and a second end of the second switch are coupled to a ground node; a control end of the second switch is configured to input a second control signal; and wherein switching frequencies of the first switch and the second switch are greater than or equal to 30 MHz.

14. The integrated circuit system according to claim 13, wherein the inductor is a film inductor, the film inductor comprising a magnetic core comprising a first magnetic film and a second magnetic film, an accommodation cavity disposed between the first magnetic film and the second magnetic film, a conductor located in the accommodation cavity, an insulating isolation film disposed on two sides of the conductor and located between the first magnetic film and the second magnetic film, the insulating isolation film being in contact with the first magnetic film and the second magnetic film, the first magnetic film and the second magnetic film each comprising a plurality of layers of magnetic sub-films and a plurality of layers of insulating sub-films, the magnetic sub-films and the insulating sub-films being alternately disposed in the first magnetic film, and the magnetic sub-films and the insulating sub-films being alternately disposed in the second magnetic film.

15. The integrated circuit system according to claim 14, wherein the plurality of layers of magnetic sub-films and the plurality of layers of insulating sub-films in the first magnetic film are exposed from a surface that is of the first magnetic film and that is in contact with the insulating isolation film.

16. The integrated circuit system according to claim 14, wherein the plurality of layers of magnetic sub-films and the plurality of layers of insulating sub-films in the second magnetic film are exposed from a surface that is of the second magnetic film and that is in contact with the insulating isolation film.

17. The integrated circuit system according to claim 13, wherein when the first switch is turned on, the second switch is turned off; and when the second switch is turned on, the first switch is turned off.

18. A power supply circuit comprising
a film inductor comprising
a magnetic core comprising a first magnetic film and a second magnetic film, an accommodation cavity disposed between the first magnetic film and the second magnetic film, a conductor located in the accommodation cavity, an insulating isolation film disposed on two sides of the conductor and located between the first magnetic film and the second magnetic film, the insulating isolation film being in contact with the first magnetic film and the second magnetic film, the first magnetic film and the second magnetic film each comprising a plurality of layers of magnetic sub-films and a plurality of layers of insulating sub-films, the magnetic sub-films and the insulating sub-films being alternately disposed in the first magnetic film, the magnetic sub-films and the insulating sub-films being alternately disposed in the second magnetic film;

a capacitor coupled to a first end of the film inductor;

a first switch; and a second switch coupled to a ground node, a second end of the film inductor being coupled to a common node between the first switch and the second switch, the power supply circuit being configured to convert a second voltage received at the first switch into a third voltage, the second voltage being greater than or equal to 0.6 V and less than or equal to 1.3 V, and supply the third voltage to a load, the third voltage being less than the second voltage, and switching frequencies of the first switch and the second switch are greater than or equal to 30 MHz.

19. The power supply circuit according to claim 18, further configured to convert a first voltage received at an input end of the power supply circuit into the second voltage.

* * * * *